US006990911B2

(12) United States Patent
Schneider

(10) Patent No.: US 6,990,911 B2
(45) Date of Patent: Jan. 31, 2006

(54) SEED PLANTING ASSEMBLY AND LIQUID APPLICATION DEVICE FOR SAME

(75) Inventor: Jeffrey M. Schneider, Altanta, GA (US)

(73) Assignee: AG-Solutions, Inc., Atlanta, GA (US)

( * ) Notice: Subject to any disclaimer, the term of this patent is extended or adjusted under 35 U.S.C. 154(b) by 81 days.

(21) Appl. No.: 10/696,189

(22) Filed: Oct. 29, 2003

(65) Prior Publication Data

US 2004/0255832 A1 Dec. 23, 2004

Related U.S. Application Data

(60) Provisional application No. 60/478,983, filed on Jun. 17, 2003.

(51) Int. Cl.
*A01C 13/00* (2006.01)
*A01C 23/00* (2006.01)
*A01C 7/00* (2006.01)
*A01C 9/00* (2006.01)

(52) U.S. Cl. .......................... 111/118; 111/34; 111/73; 111/80; 111/150; 111/186; 111/187; 111/188; 111/189; 111/197

(58) Field of Classification Search ................ 111/118, 111/73, 34, 183, 186, 170, 80, 197, 119–127, 111/189, 187, 150–157; 239/146, 159
See application file for complete search history.

(56) References Cited

U.S. PATENT DOCUMENTS

| | | | |
|---|---|---|---|
| 3,745,944 A | 7/1973 | Yetter et al. ................ 111/7 |
| 5,370,068 A | 12/1994 | Rawson et al. ............ 111/121 |
| 5,425,318 A | 6/1995 | Keeton ..................... 111/197 |
| 5,640,915 A | 6/1997 | Schaffert .................. 111/150 |
| 5,673,638 A | 10/1997 | Keeton ..................... 111/167 |
| 5,682,829 A | 11/1997 | Sukup ...................... 111/121 |
| 5,730,074 A | 3/1998 | Peter ....................... 111/118 |
| 5,752,453 A | 5/1998 | Nikkel et al. .............. 111/121 |
| 5,852,982 A | 12/1998 | Peter ....................... 111/118 |
| 5,862,763 A | 1/1999 | Dietrich, Sr. .............. 111/121 |
| 5,918,557 A | 7/1999 | Schaffert .................. 111/150 |
| 6,067,918 A | 5/2000 | Kirby ....................... 111/121 |
| 6,082,274 A | 7/2000 | Peter ....................... 111/118 |
| 6,082,275 A | 7/2000 | Schaffert .................. 111/150 |
| 6,095,065 A | 8/2000 | Dietrich, Sr. .............. 111/121 |
| 6,135,037 A | 10/2000 | Juptner .................... 111/139 |
| 6,138,590 A | 10/2000 | Colburn, Jr. .............. 111/118 |
| 6,220,191 B1 | 4/2001 | Peter ....................... 111/118 |
| 6,283,050 B1 | 9/2001 | Schaffert .................. 111/150 |
| 6,289,829 B1 | 9/2001 | Fish et al. ................. 111/121 |
| 2002/0017389 A1 | 2/2002 | Moser et al. | |

*Primary Examiner*—Christopher J. Novosad
(74) *Attorney, Agent, or Firm*—Thomas, Kayden, Horstemeyer & Risley, LLP

(57) ABSTRACT

A planting assembly including a frame, a furrow opening mechanism, a seed tube for directing a seed into a furrow, a liquid source, a liquid delivery conduit having a delivery end, and a furrow closing mechanism. An adapter is configured for mounting to the seed tube, and a spray arm including a proximal end is configured for mounting to the adapter. The spray arm includes a central portion and a distal end, the central portion extends rearward such that the distal end is disposed above the furrow. The liquid delivery conduit is in fluid communication with the liquid source and the delivery end is adjacent to the distal end.

35 Claims, 31 Drawing Sheets

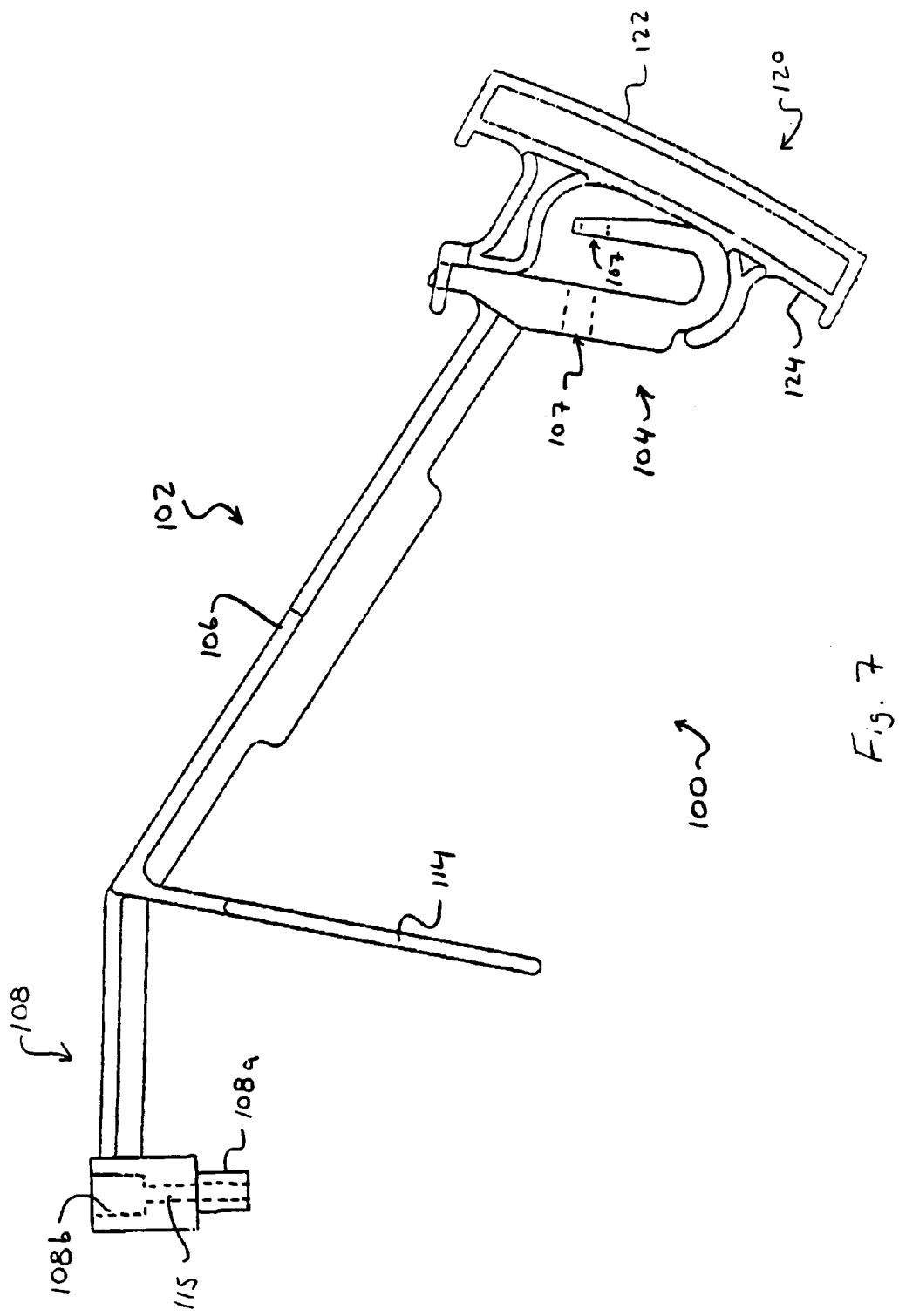

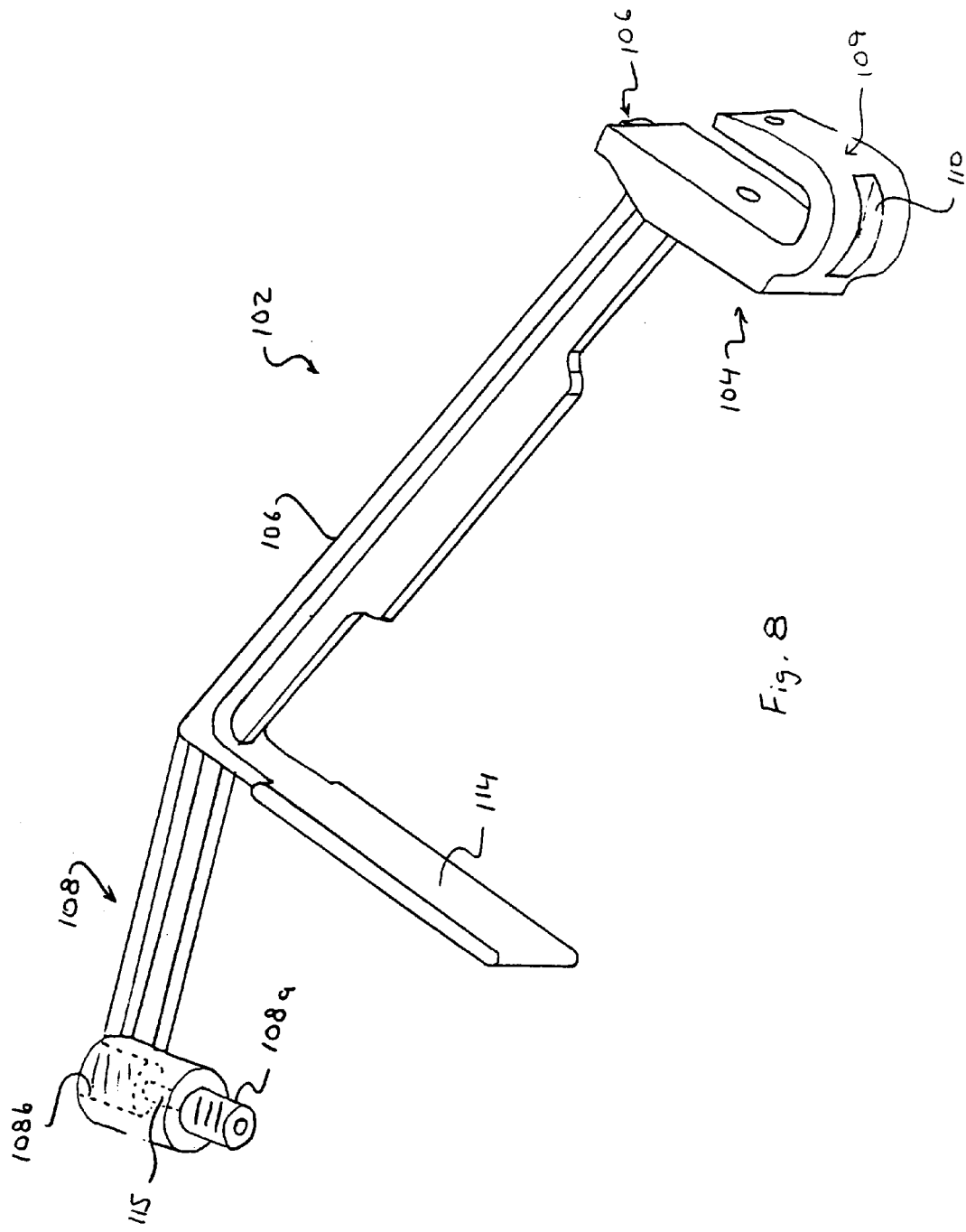

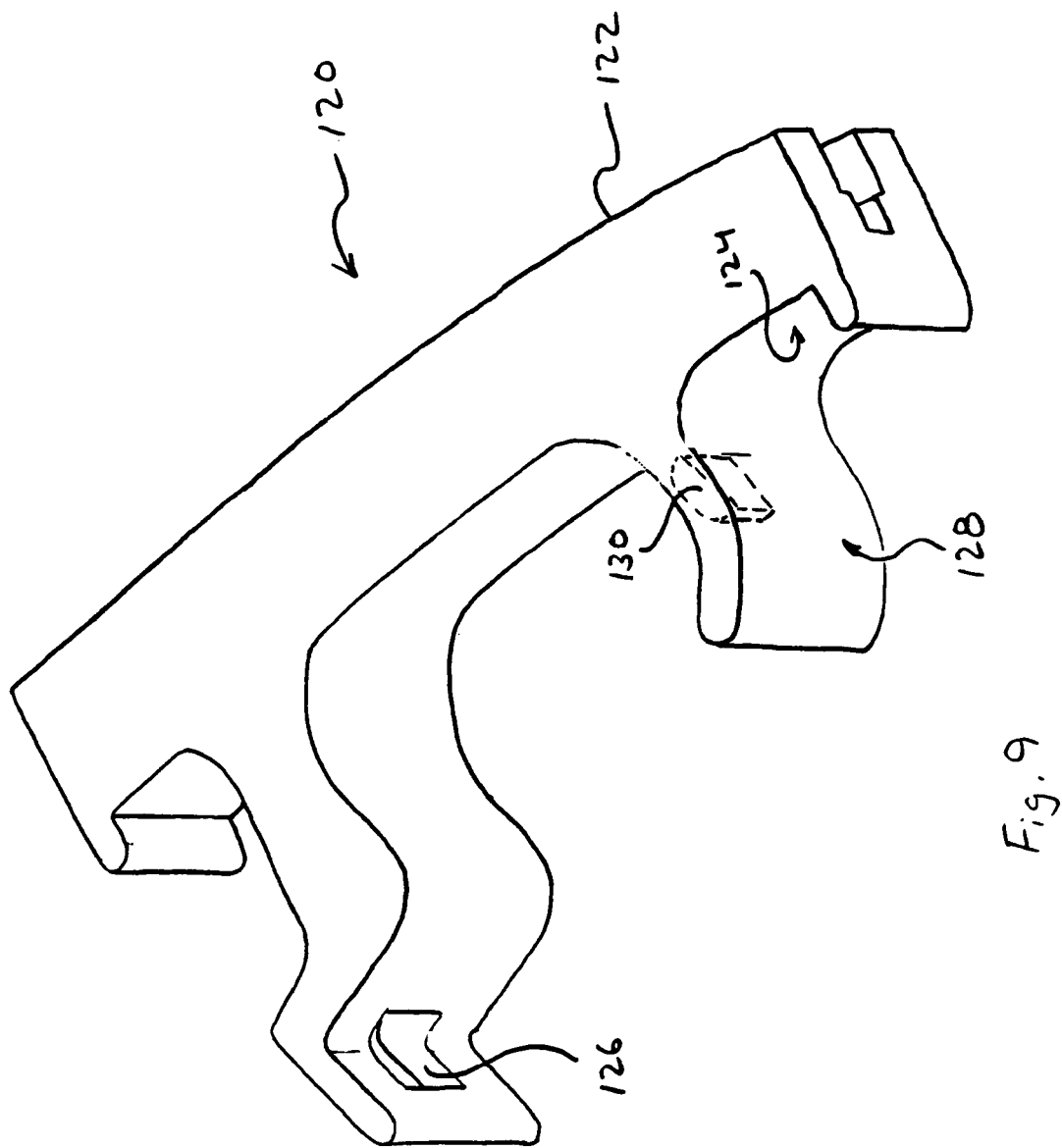

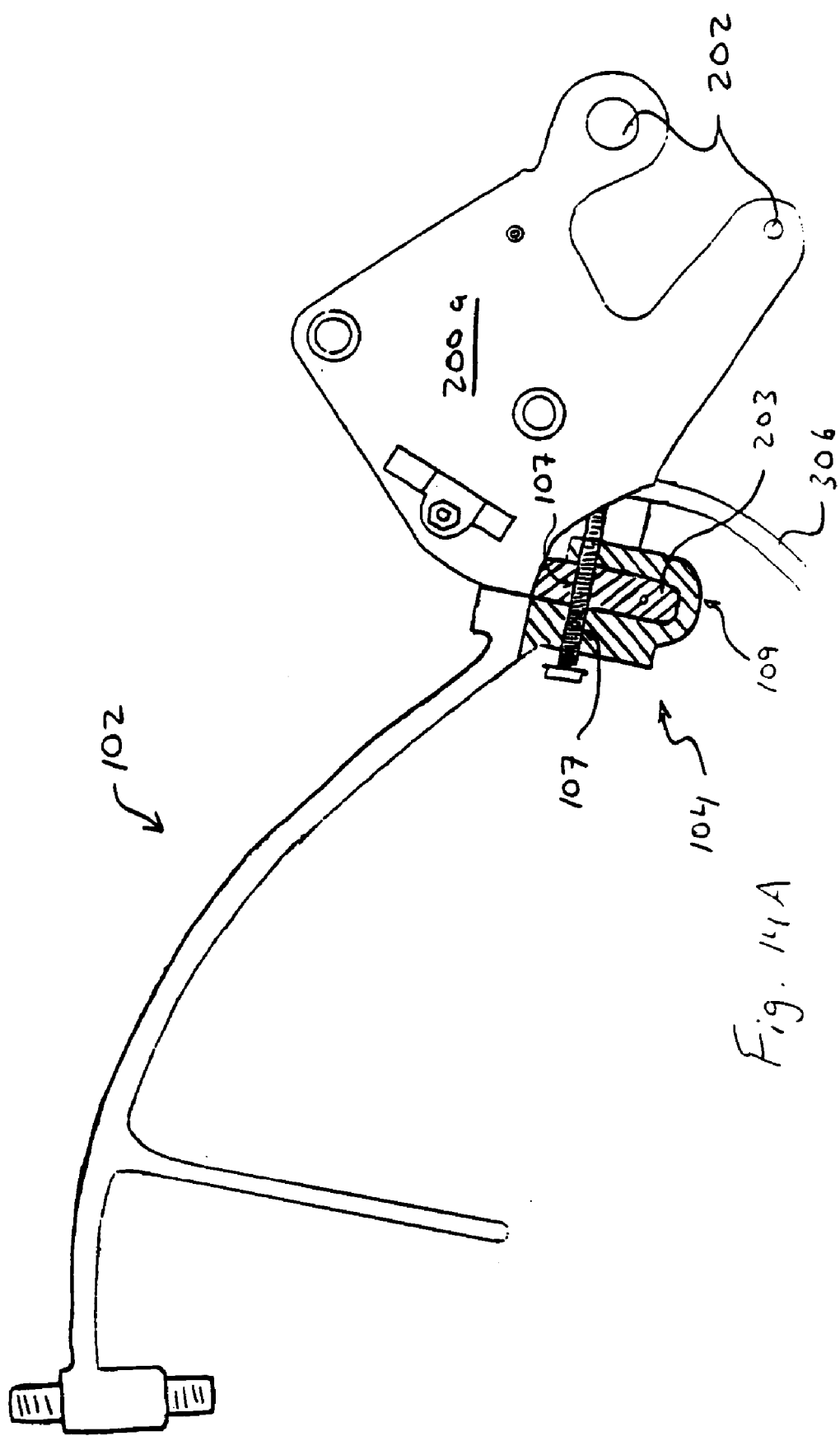

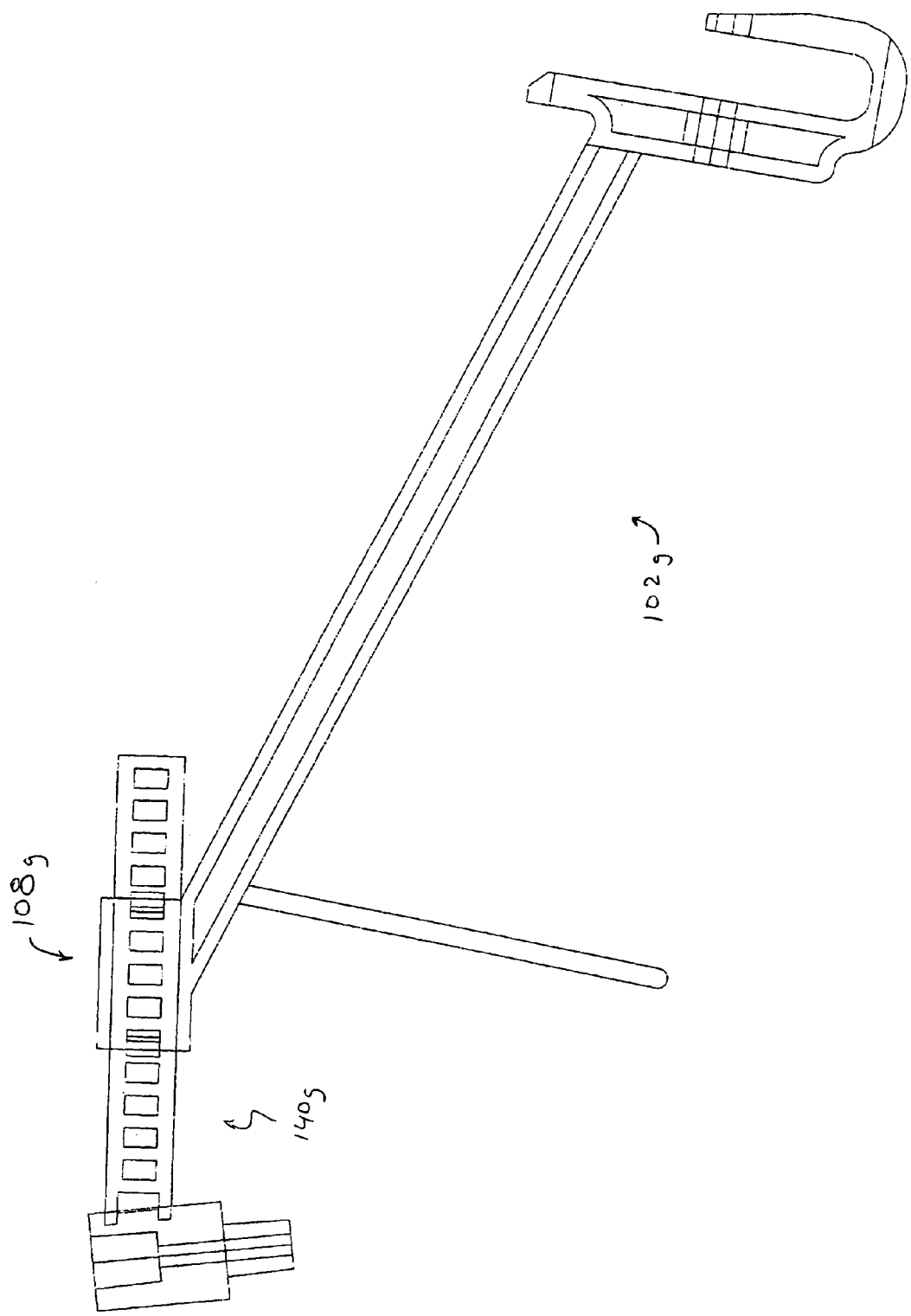

SEED PLANTING ASSEMBLY AND LIQUID APPLICATION DEVICE FOR SAME

CROSS-REFERENCE TO RELATED APPLICATION

This application claims priority to copending U.S. provisional application entitled, "SEED PLANTING ASSEMBLY AND LIQUID APPLICATION DEVICE FOR SAME," having Ser. No. 60/478,983, filed Jun. 17, 2003, which is entirely incorporated herein by reference. This application also claims priority to copending U.S. provisional application entitled, "SEED PLANTING ASSEMBLY AND LIQUID APPLICATION DEVICE FOR SAME," having Ser. No. 60/502,023, filed Sep. 11, 2003.

TECHNICAL FIELD

The present invention generally relates to seed planting assemblies. More particularly, the invention relates to a device for applying liquids to seeds dispensed into the furrow formed by the planting assembly.

BACKGROUND OF THE INVENTION

Multi-row planters are conventionally used for agricultural seed planting. Typically, each planter includes multiple row units adapted for opening a seed furrow, depositing seeds within the furrow, and closing the seed furrow around the seeds. Additionally, it is well known to utilize pesticide, fertilizer, inoculant, etc., in both liquid and dry forms, as well as delivery devices in combination with the row units.

A known delivery device for delivering liquid products such as pesticides, fertilizers, inoculants, etc., into a furrow during operation of a typical planting assembly 10 is a drop tube 19a, as shown in FIG. 1. The typical planting assembly 10 includes a frame 11 that serves to support a seed hopper 16, a seed metering unit 18, a furrow opening mechanism 12, a gauge wheel assembly 28 that is pivotally connected to the frame 11 and provides various planting positions with respect to the furrow opening device 12, and a furrow closing device 26. As the planting assembly 10 is drawn across a field, the furrow opening mechanism 12 creates a furrow 160 to a depth dictated by the gauge wheel assembly 28. Seeds 166 are received from the seed hopper 16 and the seed metering unit 18, which determines the rate at which seeds 166 are delivered down a seed guide 14 to the seed tube 15, which directs the seeds 166 into the bottom of the furrow 160. The drop tube 19a delivers the desired liquid composition into the bottom of the furrow 160, and therefore onto each seed 166. To ensure the liquid composition is accurately administered to the seeds 166, typical drop tubes 19a have delivery end 24 disposed in close proximity to the furrow 160. As well, drop tubes 19a are frequently secured to the seed tube 15, meaning their delivery end 24 are also located in close proximity to the furrow opening mechanism 12.

As would be expected, furrow opening mechanisms 12 create a turbulent soil environment while opening the furrow 160. This can lead to blockage of the delivery end 24 of the drop tube 19a, and therefore result in inadequate application of the desired liquid composition into the furrow 160 and on the seeds 166. Also, the majority of liquid composition applied to the furrow 160 by the drop tube 19a is applied only to the bottom of the furrow 160, and not the side walls. When used with liquid pesticides, this can potentially result in inadequate protection for the seed 166 and its developing root ball, in that the root ball may extend beyond the zone of protection provided by the drop tube method of applying pesticides.

As shown in FIG. 2, another known device for delivering liquid pesticides and fertilizers is the spray tube 19b. Similar to the drop tube 19a, existing spray tubes 19b frequently have delivery end 24 located in close proximity to the furrow 160. As such, it is possible for spray tubes 19b to experience clogging of their delivery end 24 and subsequent poor performance. As well, spray tubes 19b are frequently quite long. This can lead to problems in that during operation, the planting assembly 10 typically encounters obstructions such as rocks, debris, etc., and may therefore experience quite a bit of vibration, which is transmitted to the spray tubes 19b. Due to their length, it is not uncommon for the delivery end 24 of existing spray tubes 19b to vibrate erratically and therefore apply excess amounts of the liquid products outside of the furrow 160. This is generally disadvantageous since the pesticide and/or fertilizer may be transported by wind or run-off from rainfall, and does not serve to protect or nourish the seeds 166.

In recent years, some farmers have begun to use seed positioning devices with their planting assemblies 10. One such device is the REBOUNDER™ device disclosed in U.S. Pat. No. 5,640,915 and manufactured by Schaffert Manufacturing Company, Inc. As seeds 166 pass through the seed tube 15, it is possible for the seeds 166 to move within the seed tube 15 such that the seeds 166 leave the seed tube 15 in a direction other than that desired. Therefore, it is possible that a seed 166 could end up on a side wall of the furrow 160 rather than in the bottom, as desired. The REBOUNDER™ device 30a, which is normally attached to the seed tube 15, helps to position seeds 166 in the bottom of the furrow 160. As would be expected, it is still desirable to apply various liquids, such as fertilizers and pesticides, to those seeds 166 that are dispensed from the planting assembly 10 with the aid of the REBOUNDER™ device 30a.

As shown in FIG. 3, a liquid delivery conduit 20 can be attached to the seed positioning device 30a and/or the seed tube 15 such that the delivery end 24 of the liquid delivery conduit 20 extends slightly beyond the seed positioning device 30a. As such, the delivery end 24 of the liquid delivery conduit 20 is typically disposed in close proximity to, if not in, the furrow 160. As previously noted, positioning the delivery end 24 of a liquid delivery conduit 20 in close proximity to the furrow 160 can lead to clogging of the delivery end 24 and inadequate application of the liquid products. In addition, this method does not allow for the application of liquids in a wide and readily adjustable spray pattern, which is often desired.

Another popular seed positioning device used by farmers is the KEETON® seed firming attachment disclosed in U.S. Pat. No. 5,425,318. The KEETON® seed firming attachment 30b usually attaches to the seed tube 15 of the planting assembly 10 and presses seeds 166 into the bottom of the furrow 160 as it passes over them. The KEETON® seed firming device 30b attempts to place the seeds 166 at a desired depth within the furrow 160 and reduce air pockets about the seeds 166.

As shown in FIG. 4, liquid delivery conduits 20 can also be attached to the seed firming device 30b and/or seed tube 15 so as to deliver liquids into the furrow 160. Again, the delivery end 24 of the liquid delivery conduit extends slightly beyond the seed firming device 30b, and is disposed in the furrow 160. As with other existing liquid delivery devices, by so positioning the delivery end 24 of the liquid delivery conduit 20, the delivery end 24 can be prone to clogging and misapplication of the liquid products.

As previously noted, the planting assembly 10 typically encounters obstructions such as rocks, debris, etc., during operation. Similarly, seed positioning devices 30a, 30b experience similar obstructions as they travel down their respective furrows 160. The stresses and vibration caused by these obstructions are in turn transmitted to the seed tubes 15 to which each seed positioning device 30a, 30b is attached. As such, it is often advantageous to mount the seed positioning device 30a, 30b to a portion of the frame 11 rather than the seed tube 15. Therefore, various manufacturers provide brackets 200a, 200b (FIGS. 5A and 5B) which allow the seed positioning devices 30a, 30b to be mounted to the frame 11. FIG. 5A is a partial view of a KEETON® seed firming device 30b attached to a KEETON GOLD® bracket 200a. FIG. 5B is a partial view of a KEETON® seed firming device 30b secured to a KEETON GOLD® wrap-around bracket 200b. In both instances, the seed firming device 30b is received within an internal cavity of the bracket 200a, 200b and secured therein with a threaded fastener. As well, both brackets 200a, 200b include mounting holes 202 for securing the bracket 200a, 200b and its associated seed firming device 30b to a portion of the planting assembly 10 frame 11. FIG. 6 shows a seed firming device 30b attached to the frame 11 with a KEETON GOLD® bracket 200a.

From the foregoing, it can be appreciated that it would be desirable to have a planting assembly and liquid application device for same that uniformly distributes a desired amount of liquid into at least a portion of a furrow and onto the seeds. As well, it would be desirable if the liquid application device could be used alone or with various other attachments to the planter assembly, such as seed positioning devices.

SUMMARY

Briefly described, a seed planting assembly and liquid application device for same provides an apparatus and method for distributing liquids into a furrow. An embodiment, among others, provides a planting assembly comprising a frame and a furrow opening mechanism. The embodiment also includes a seed tube for directing a seed into a furrow, a liquid source, a liquid delivery conduit having a delivery end, and a furrow closing mechanism, an adapter configured for mounting to the seed tube, a spray arm including a proximal end configured for mounting to the adapter, a central portion, and a distal end. The central portion extends rearward such that the distal end is disposed above the furrow and the liquid delivery conduit is in fluid communication with the liquid source and the delivery end is adjacent to the distal end.

Another embodiment of the planting assembly includes a frame, a seed guide, a furrow opening mechanism, a seed tube for directing a seed into a furrow, a liquid source, a liquid delivery conduit having a delivery end, a seed positioning device connected to the frame with a bracket, and a furrow closing mechanism. The embodiment includes a spray arm having a proximal end configured for mounting to the bracket, a central portion, and a distal end. The proximal end is mounted to the bracket and the central portion extends rearward such that the distal end is disposed above the furrow. The liquid delivery conduit is in fluid communication with the liquid source and the delivery end is adjacent to the distal end.

Another embodiment of the planting assembly includes a frame, a seed guide, a seed tube for directing seeds into a furrow, a liquid source, and a liquid delivery conduit having a delivery end. The embodiment includes a seed positioning device for positioning the seeds within the furrow, means for securing the seed positioning device to the frame, and a spray arm including a proximal end and a distal end. The proximal end is adjacent to the means for securing and the distal end is disposed above the furrow. The liquid delivery conduit is in fluid communication with the liquid source and the delivery end is adjacent to the distal end.

Another embodiment of the liquid application device for use with a planting assembly includes a frame, a furrow opening mechanism, a seed tube for directing a seed into a furrow, a liquid source, a seed positioning device for positioning a seed within a furrow, a bracket for connecting the seed positioning device to the frame, a liquid delivery conduit having a delivery end, and a furrow closing mechanism. The device includes a spray arm including a proximal end configured for mounting to the bracket, a central portion, and a distal end. The central portion extends rearward such that the distal end is disposed above the furrow. The liquid delivery conduit is in fluid communication with the liquid source and the delivery end is adjacent to the distal end.

The planting assembly and liquid application device for same can also be viewed as providing a method of application of liquid to a furrow. The method of application of a liquid to a furrow with a planting assembly having a frame, a furrow opening mechanism, a seed tube for directing a seed into the furrow, a liquid source, a liquid delivery conduit having a delivery end, a seed positioning device attached to the frame with a bracket, and a furrow closing mechanism, includes the steps of providing a spray arm including a proximal end configured for mounting to the bracket, forming the furrow with the planting assembly, and directing the liquid downwardly into at least a portion of the furrow aft of the seed tube, thereby applying the liquid to the seed and the furrow, and closing the furrow over the seed.

Another embodiment of the liquid application device for use with a planting assembly includes a frame, a furrow opening mechanism, a seed tube for directing a seed into a furrow, a liquid source, a liquid delivery conduit having a delivery end, and a furrow closing mechanism. The device includes a spray arm including a proximal end configured for mounting to the planting assembly, a central portion, and a distal end. The central portion extends rearward such that the distal end is disposed above the furrow. A spray head is configured to be telescopically received on the distal end of the spray arm. The liquid delivery conduit is in fluid communication with the liquid source and the delivery end is adjacent to the distal end.

Another embodiment of the liquid application device for use with a planting assembly includes a frame including a mounting hole, a furrow opening mechanism, a seed tube for directing a seed into a furrow, a liquid source, a liquid delivery conduit have a delivery end, and a furrow closing mechanism. The device includes a spray plug including a proximal end configured for urging through the mounting hole, a distal end, a central portion disposed therebetween and including a fluid passage in fluid communication with the distal and proximal ends. The liquid delivery conduit is in fluid communication with the liquid source and the delivery end is in fluid communication with the proximal end.

Other systems, methods, features, and advantages of the planting assembly and liquid application device for same will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The planting assembly and liquid application device for same can be better understood with reference to the following drawings. The components in the drawings are not necessarily to scale, emphasis instead being placed upon clearly illustrating the principles of the planting assembly and liquid application device for same. Moreover, in the drawings, like reference numerals designate corresponding parts throughout the several views.

FIG. 7 is a side view of a preferred embodiment of a liquid application device according to the present invention.

FIG. 8 is a side perspective view of a preferred embodiment of a liquid application device according to the present invention.

FIG. 9 is a side perspective view of a preferred embodiment of an adapter for mounting an embodiment of a liquid application device according to the present invention to a planting assembly.

FIGS. 14A and 14B are cut-away side views of liquid application devices attached to brackets which in turn would be connected to planting assemblies.

FIG. 25 is a side view of a preferred embodiment of a liquid application device according to the present invention.

Figure 1:
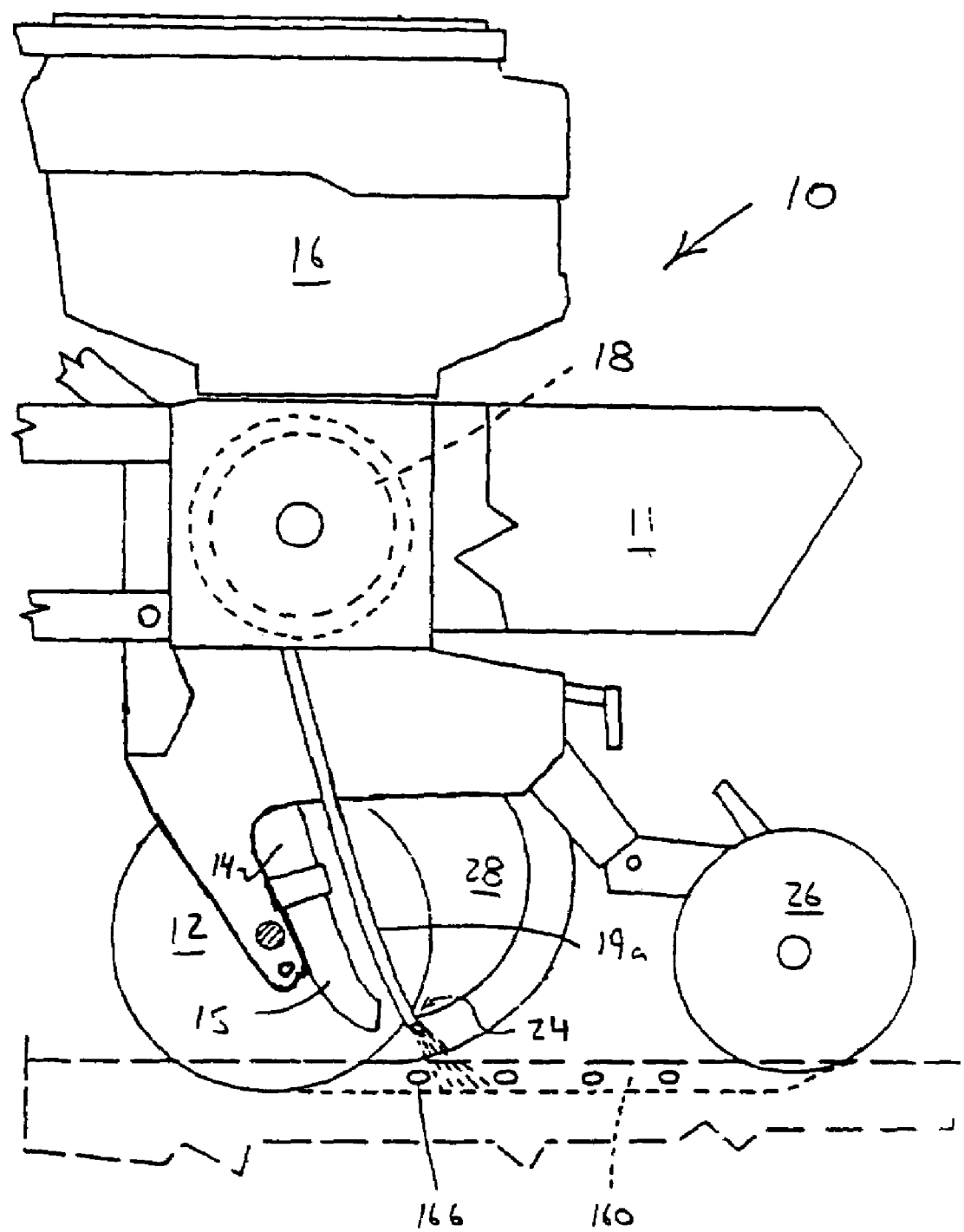
FIG. 1 is a side view of a planting assembly including an existing liquid application device.
Figure 2:
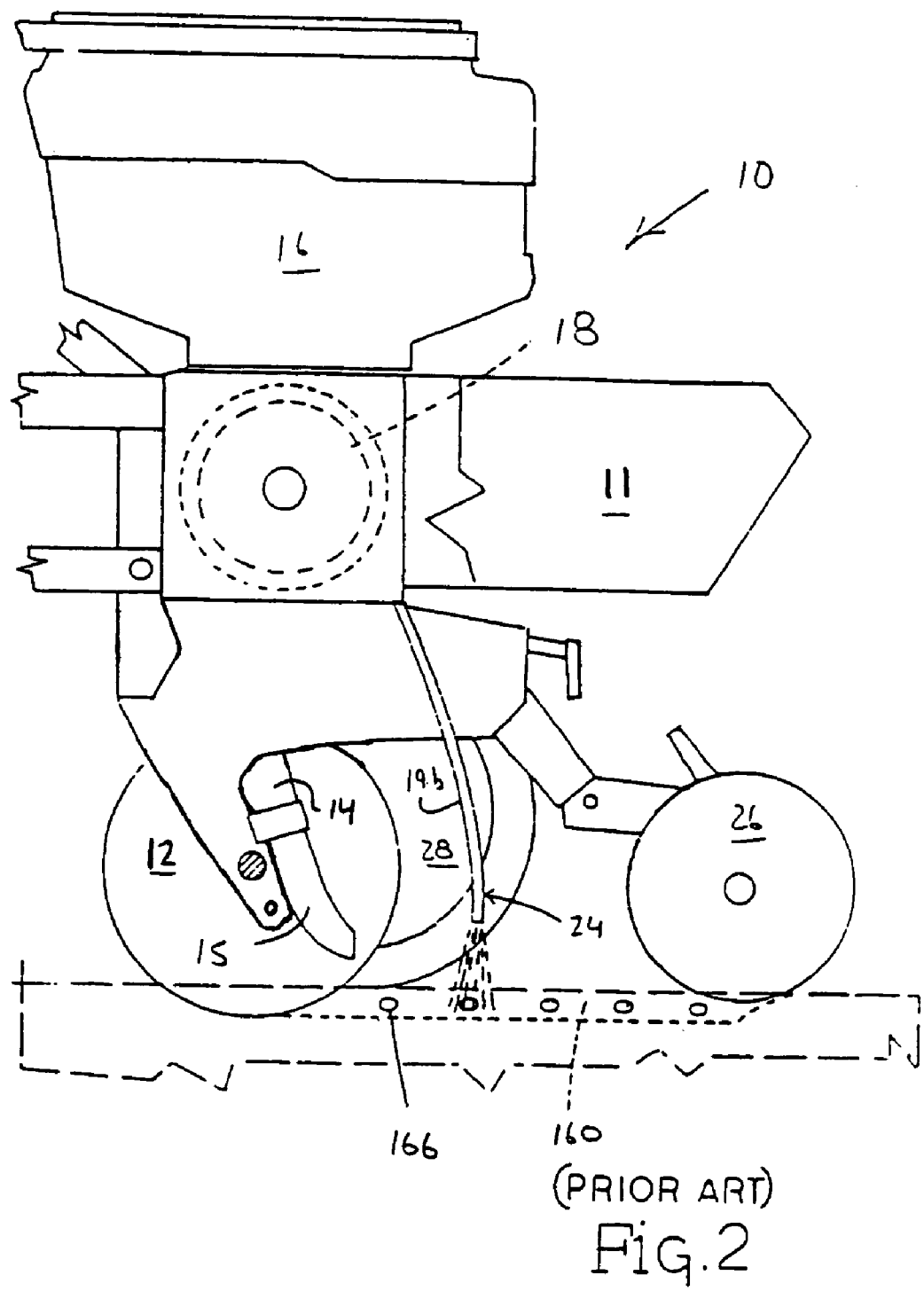
FIG. 2 is a side view of a planting assembly including an existing liquid application device.

Reference will now be made in detail to the description of the planting assembly and liquid application device for same as illustrated in the drawings. While the planting assembly and liquid application device for same will be described in connection with these drawings, there is no intent to limit the planting assembly and liquid application device for same to the embodiment or embodiments disclosed therein. On the contrary, the intent is to cover all alternatives, modifications, and equivalents included within the spirit and scope of the planting assembly and liquid application device for same as defined by the appended claims.

DETAILED DESCRIPTION OF THE PREFERRED EMBODIMENT

Figure 10A:
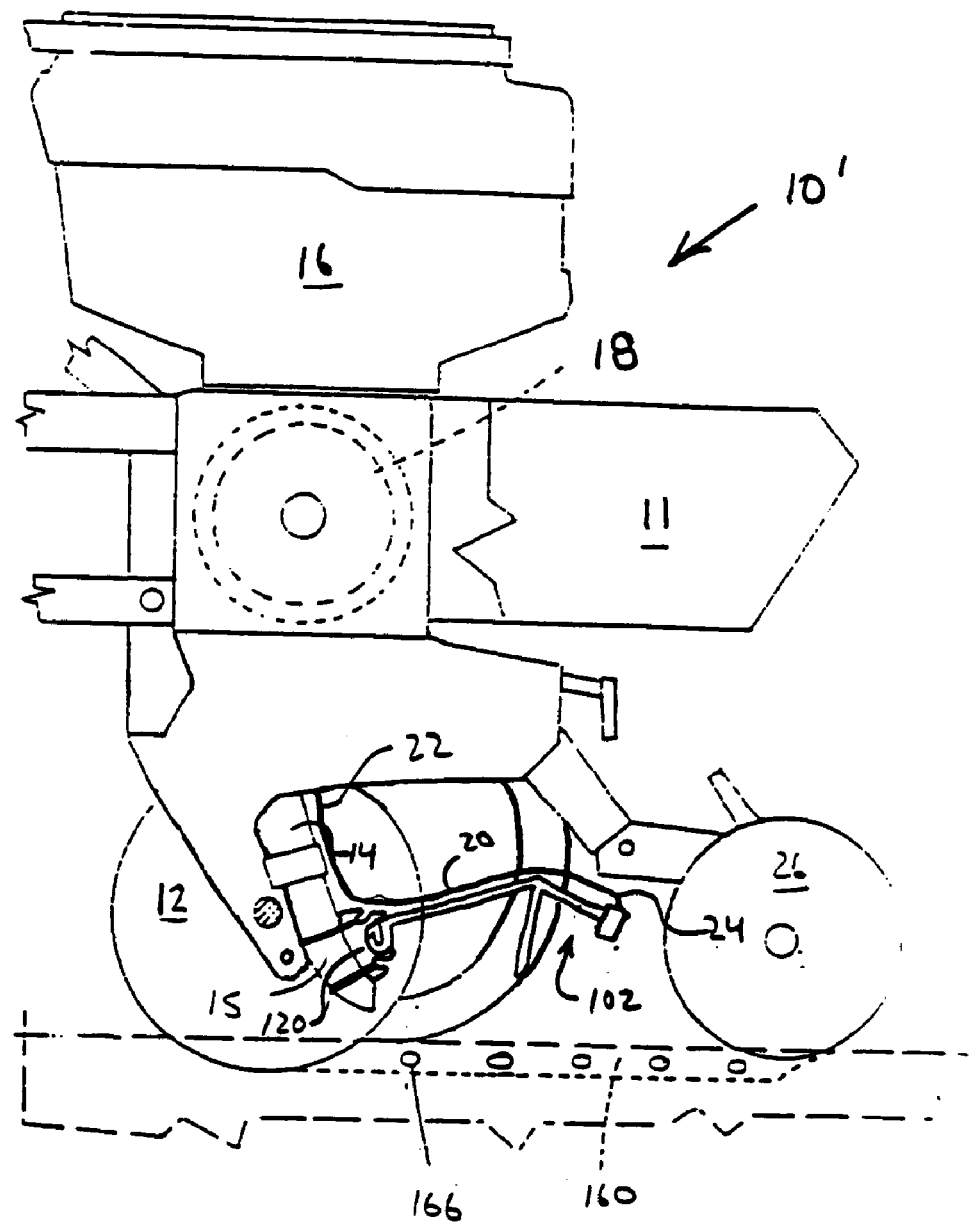
FIGS. 10A and 10B are side views of a planting assembly including a preferred embodiment of a liquid application device according to the present invention.

Referring now in more detail to the drawings, FIG. 7 illustrates a preferred embodiment of a liquid application 100 device configured for attachment to a planting assembly 10' (FIG. 10A). As shown, the liquid application device 100 includes a spray arm 102 and an adapter 120. The adapter 120 includes a first side 122 configured for mounting to a seed tube 15 or seed positioning device 30a, 30b and a second side 124 configured to removably receive the proximal end 104 of the spray arm 102. As shown, the spray arm 102 includes a proximal end 104, discussed in greater detail hereafter, configured for mounting to either the adapter 120 or a seed positioning device bracket 200a, 200b (such as those shown in FIGS. 5A and 5B), a central portion 106, a distal end 108, and a deflector shield 114. Preferably, the central portion 106 of the spray arm 102 is configured so as to support the distal end 108 an adequate distance above the furrow 160, thereby preventing the turbulence of dirt and debris within the furrow 160 from interfering with liquid application operations and allowing for a wide spray pattern if necessary. As well, the deflector shield 114 is disposed on the central portion 106 of the spray arm 102 to prevent dirt and debris kicked up by the planting assembly 10' from reaching the distal end 108 of the spray arm.

Figure 5A:
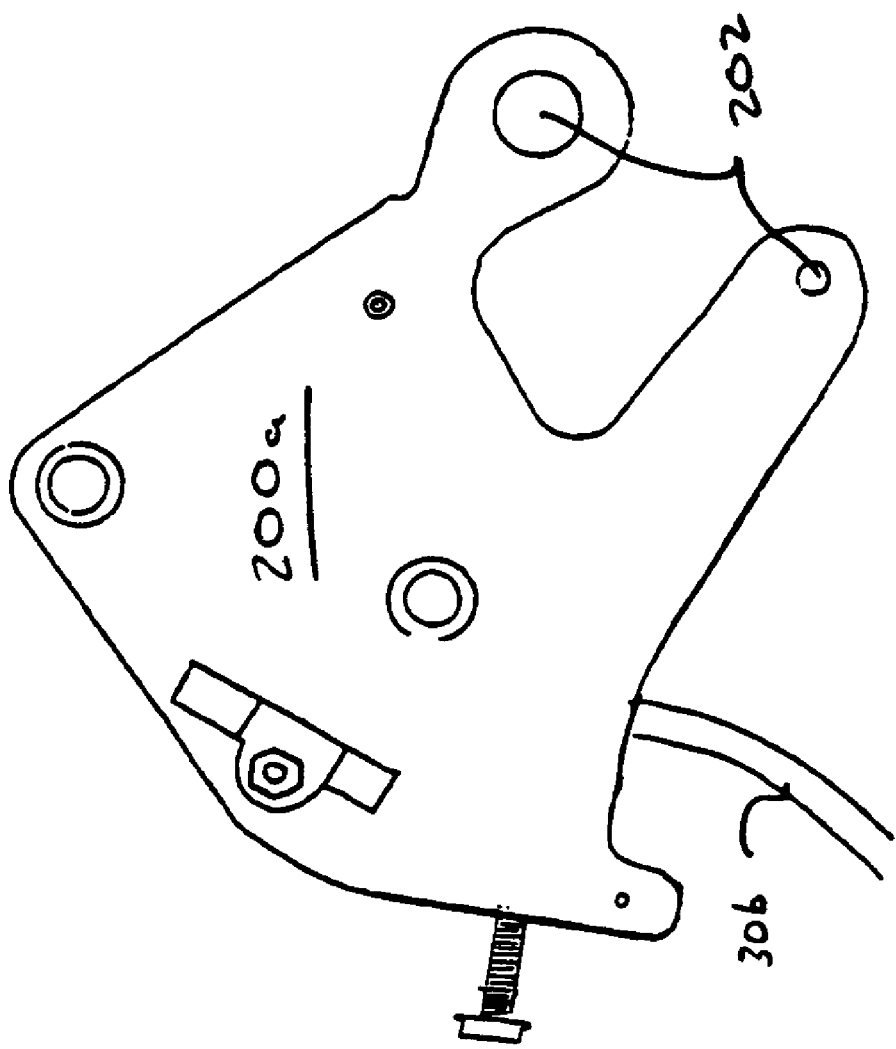
FIGS. 5A and 5B are partial side views of existing seed positioning devices and their associated brackets for mounting the seed positioning devices to a planting assembly.
Figure 5B:
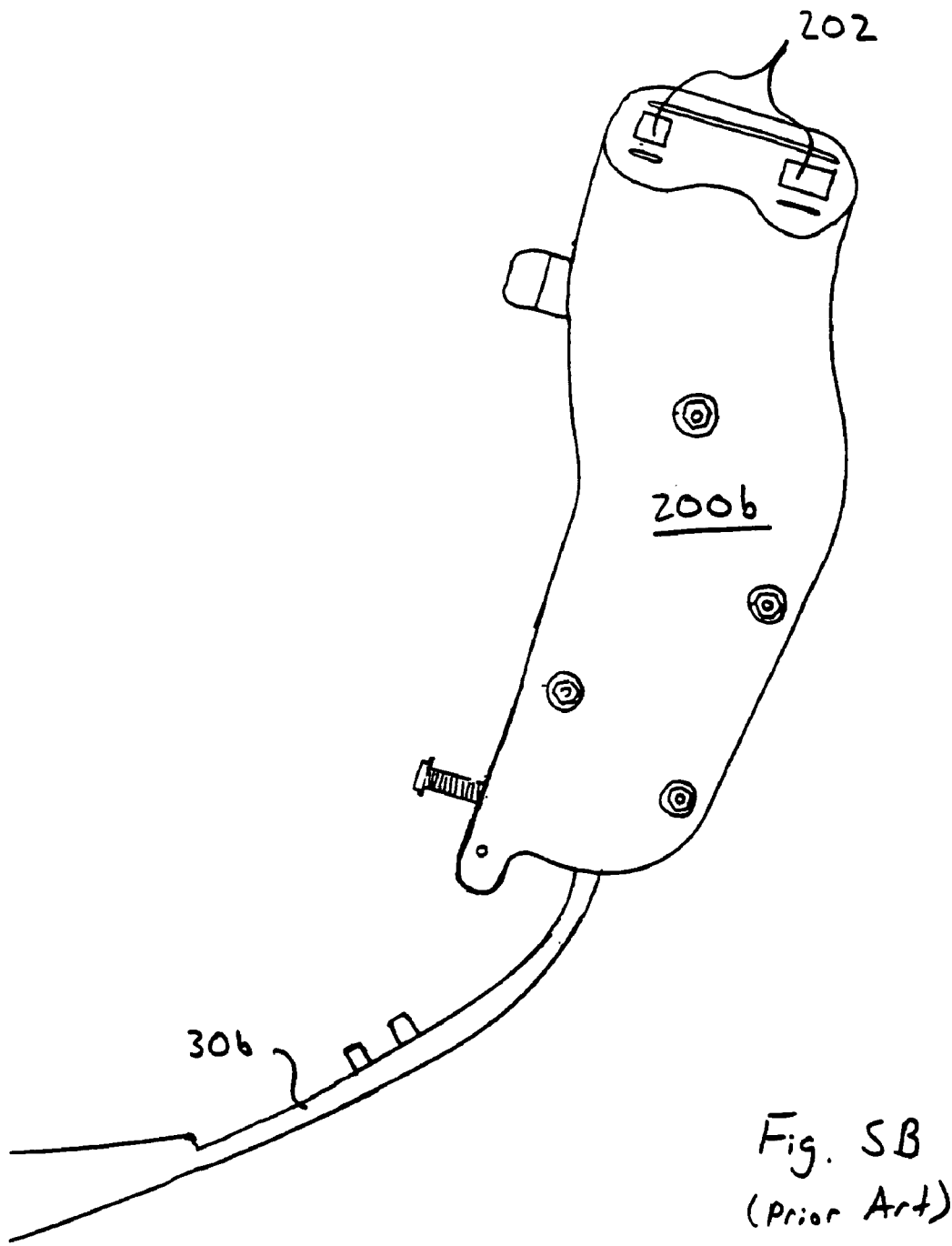
Figure 6:
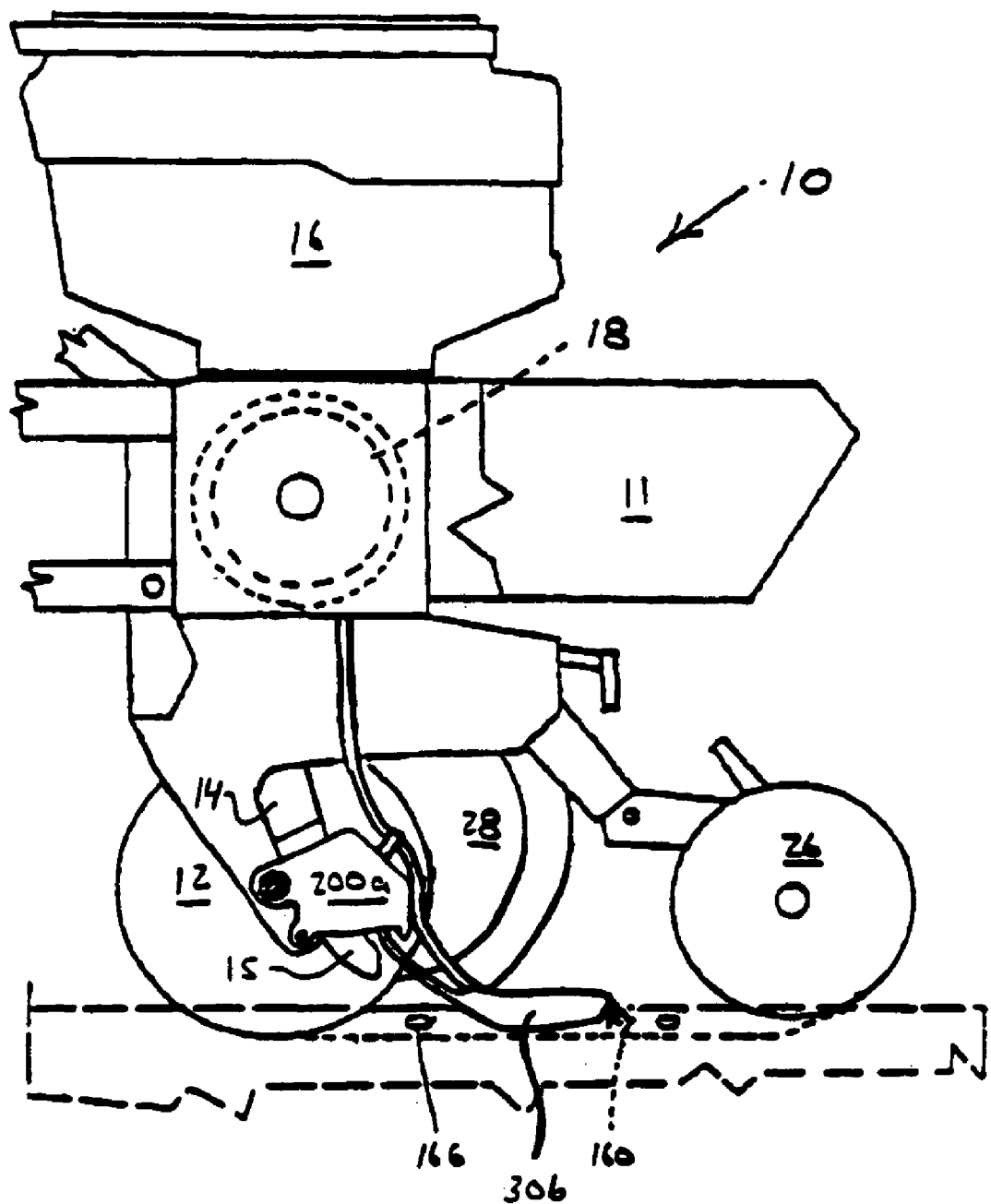
FIG. 6 is a side view of a planting assembly including an existing seed positioning device and an existing liquid application device.

FIGS. 8 and 9 show perspective side views of the spray arm 102 and adapter 120, as shown in FIG. 7. Preferably, some embodiments of the spray arm 102 include threaded portions 108a, 108b on the distal end 108. Threaded portion 108a can be used to attach various nozzles (not shown) to the distal end 108 to adjust spray patterns. Threaded portion 108b can be used to connect the delivery end of a fluid delivery conduit (not shown) to the distal end 108, thereby aligning the fluid delivery conduit with fluid passage 115 and subsequently the spray nozzle. As previously noted, the proximal end 104 of the spray arm 102 is configured for mounting to either the adapter 120 or a seed positioning device bracket 200a, 200b (FIGS. 5A and 5B). The proximal end 104 preferably includes a locking tab 106, a J-shaped portion 109, and an alignment groove 110 formed at the bottom of the J-shaped portion 109. Preferably, the adapter 120 includes a hook portion 128 configured to receive the J-shaped portion 109 of the spray arm 102 and a locking aperture 126 configured to receive the locking tab 106 of the spray arm 102. As such, the spray arm 102 is removably secured to the adapter 120 by positioning the J-shaped portion 109 of the spray arm 102 in the hook portion 128 of the adapter 120 such that the alignment notch 130 is disposed in the alignment groove 110, and the spray arm 102 is rotated inwardly toward the adapter 120 until the locking tab 106 is received within the locking aperture 126. In this configuration, the spray arm 102 and adapter 120 can be mounted either directly to a seed tube 15 or adjacent a seed positioning device 30a, 30b.

Figure 10B:
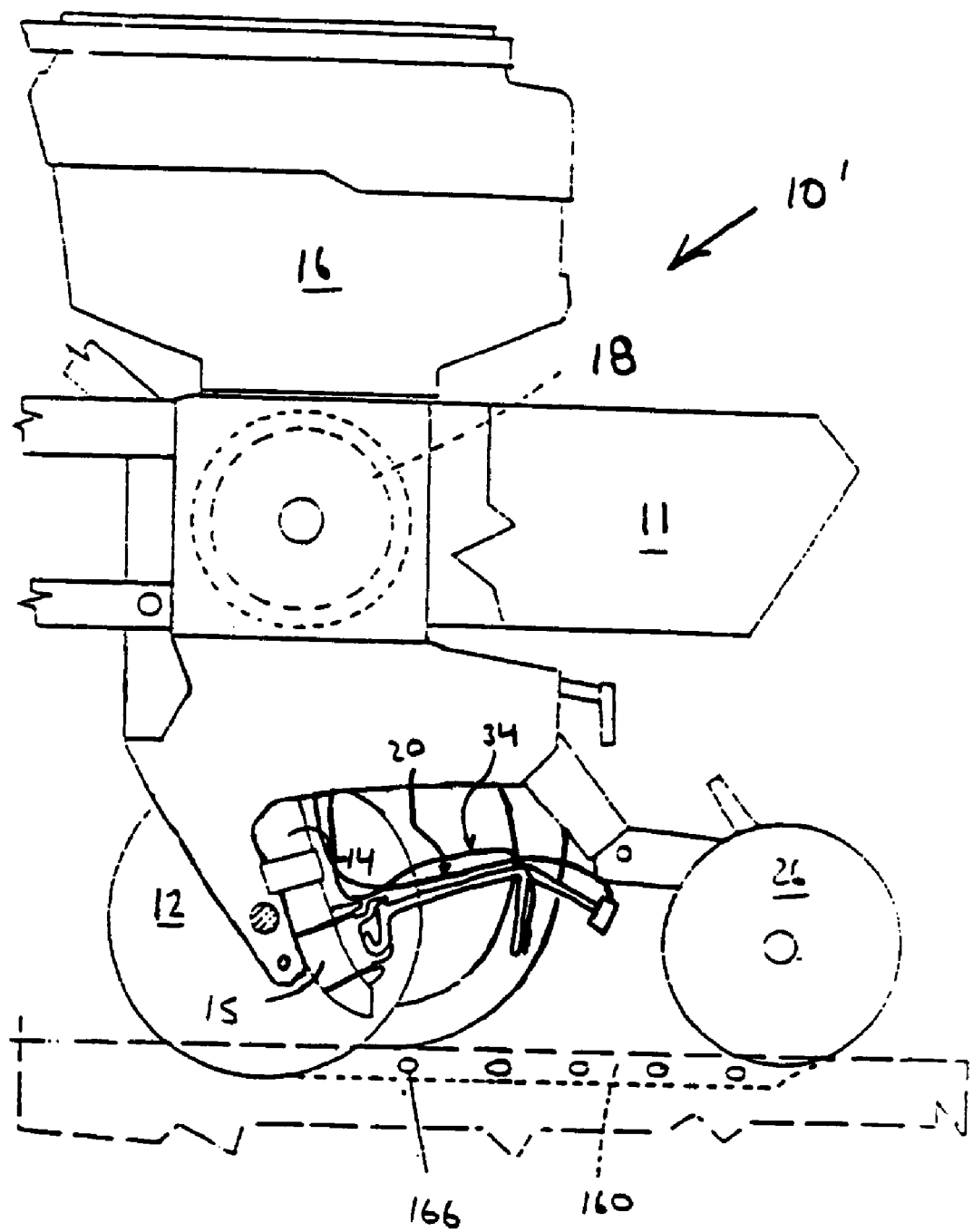

As shown in FIG. 10, both the adapter 120 and spray arm 102 of a preferred embodiment of the liquid application device 100 can be attached to the seed tube of a planting assembly 10'. Plastic ties, metal bands, etc. all function as adequate means of attaching the spray arm 102 and the adapter 120 to the seed tube 15. The spray arm 102 extends rearwardly toward the furrow closing mechanism 26, thereby positioning the distal end 108 of the spray arm 102 both above the furrow 160 and adequately aft of the furrow opening mechanism 12 to avoid airborne dirt and debris caused by the planting assembly 10'. Preferably, a liquid delivery conduit 20 has a first end 22 in fluid communication with a liquid source (not shown) located on the planting assembly 10' and a delivery end 24 disposed on the distal end 108 of the spray arm 102. So positioned, the delivery end 24 of the liquid delivery conduit 20 can deliver liquid pesticides and/or fertilizers, for instance, without the delivery end 24 becoming clogged by dirt and debris. To further insure proper operation, a deflector shield 114 is disposed on the central portion 106 of the spray arm 102 between the furrow opening mechanism 12 and the distal end 108 of the spray arm.

Figure 11A:
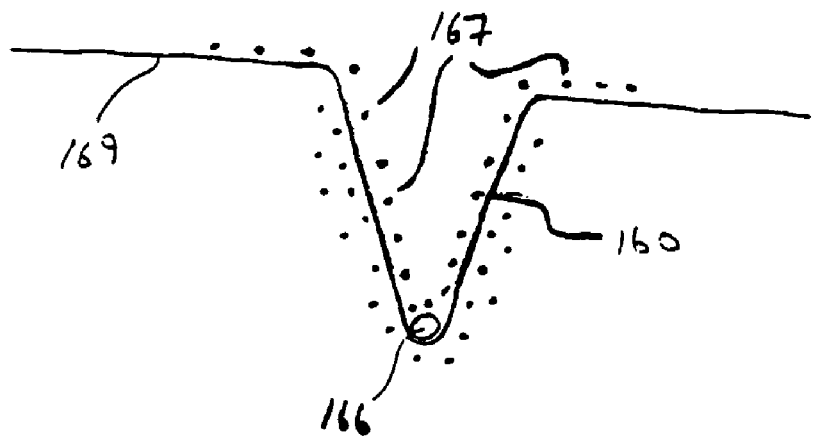
FIGS. 11A and 11B are sequential drawings of a furrow as formed by a planting assembly including a preferred embodiment of a liquid application device according to the present invention.
Figure 11B:
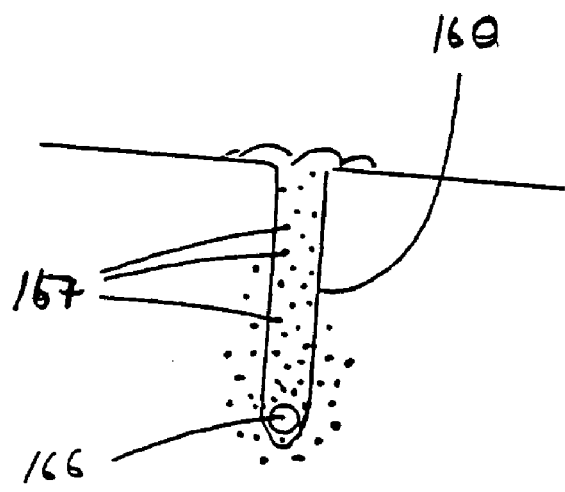

Preferably, the distal end 108 of the spray arm is configured such that the delivery end 24 sprays liquid into the furrow 160 in a direction that is slightly forward of vertical. By spraying the liquid into the furrow 160 in a slightly forward direction, the operator insures that the liquid is applied to the furrow 160 in a predictable manner. Ideally, the dispensed liquid, such as pesticide, will be applied to the furrow 160 in a "T-band" spray pattern of approximately 5 to 7 inches in width. To assist in achieving this pattern, a spray nozzle (not shown) is preferably included on the distal end 108 of the spray arm 102 in fluid communication with the delivery end 24 of the liquid delivery conduit 20. A desired "T-Band" distribution of liquid within the furrow 160 and on the seeds 166 is shown in FIG. 11A. Note that in FIG. 11A, the desired distribution includes spraying at least a portion of the liquid onto the upper surface 169 of the soil surrounding the furrow 160. Other preferred embodiments include distributing the liquid into only the furrow 160. After the desired liquids have been applied to the furrow 160, the furrow closing mechanism 26 closes the furrow above the seeds 166, as shown in FIG. 11B.

The liquid application device 100, as shown in FIG. 10A, can be modified such that multiple liquids, for example, pesticide and fertilizer, can be applied to the furrow 160 simultaneously. The liquid application device 100 shown in FIG. 10B includes a second liquid delivery conduit 34 that runs along the central portion 106 of the spray arm 102 and is connected to the deflector shield 114 on the side disposed toward the furrow closing mechanism 26. As such, the second liquid delivery conduit 34 is also protected from dirt and debris by the deflector shield 114, and can be used to apply liquids into the furrow 160.

Figure 3:
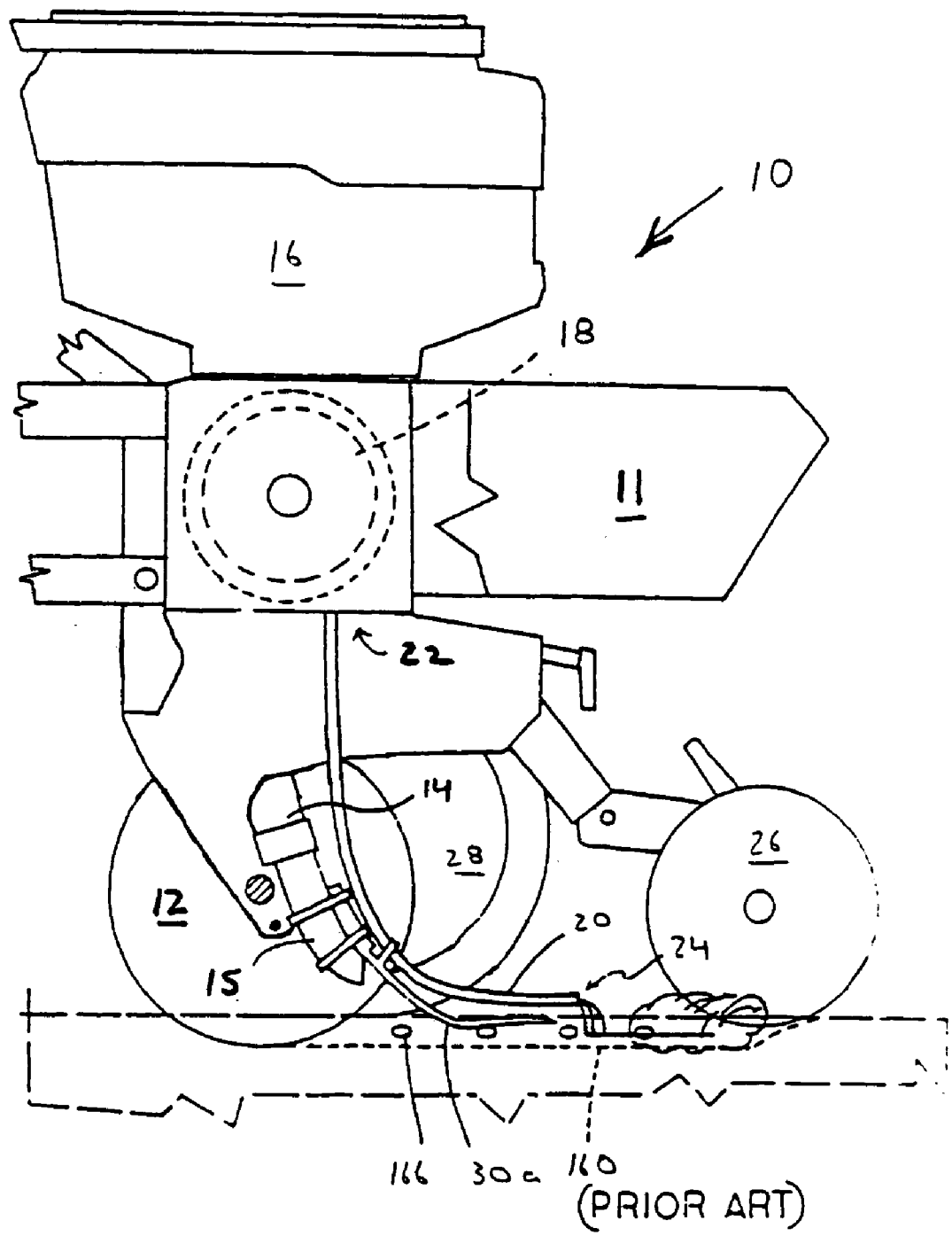
FIG. 3 is a side view of a planting assembly including an existing seed positioning device and an existing liquid application device.
Figure 4:
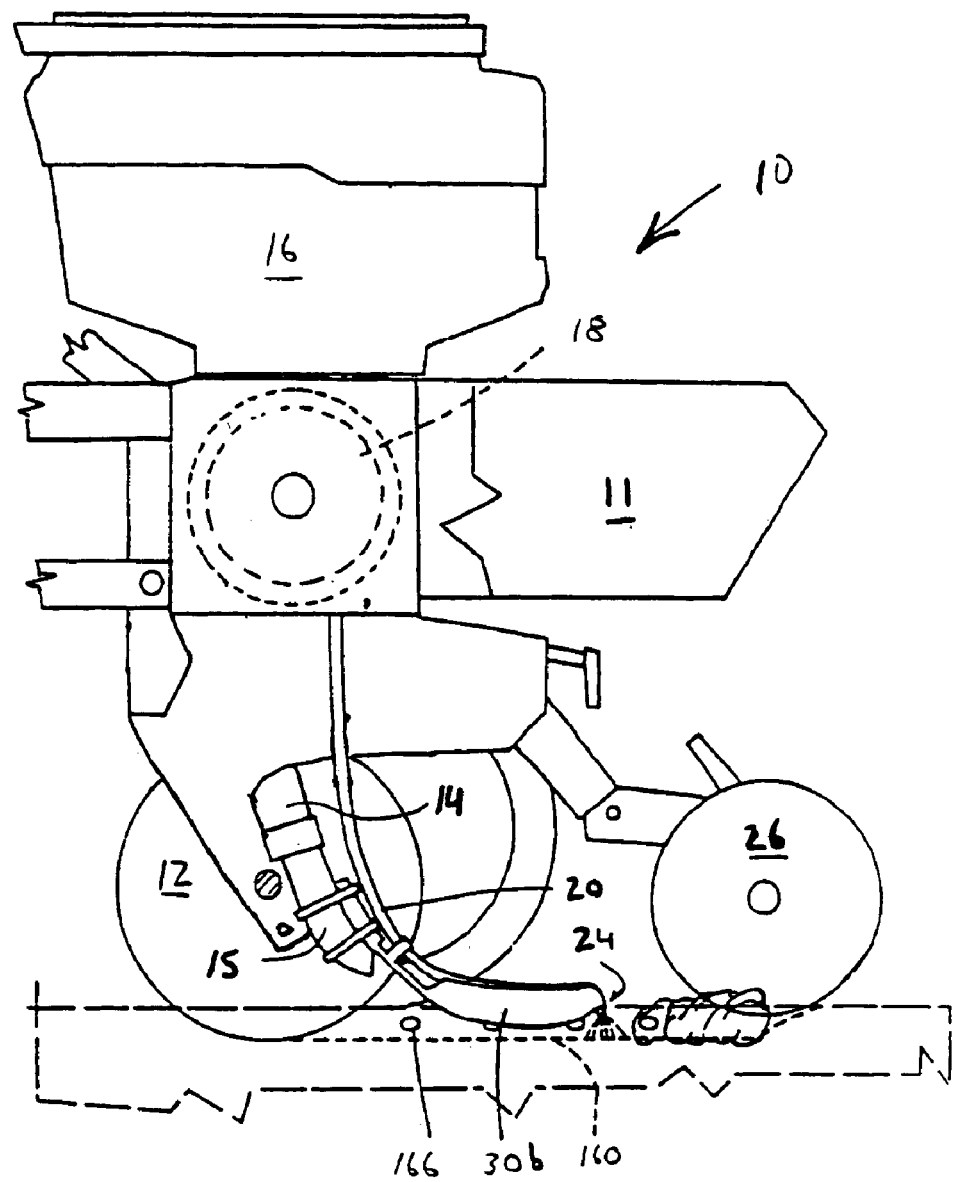
FIG. 4 is a side view of a planting assembly including an existing seed positioning device and an existing liquid application device.
Figure 12:
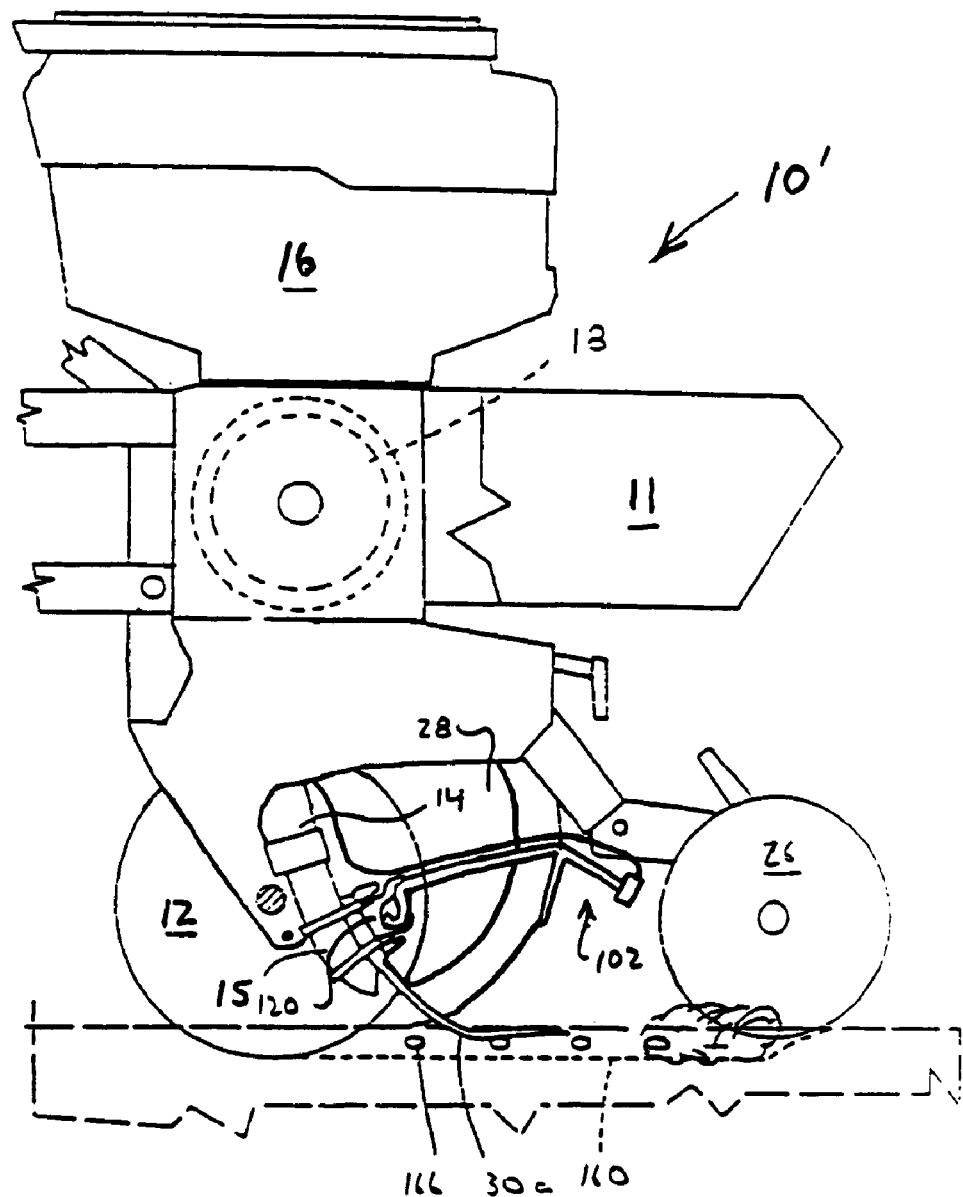
FIG. 12 is a side view of a planting assembly including the liquid application device as shown in FIG. 7 as used with an existing seed positioning device.
Figure 13:
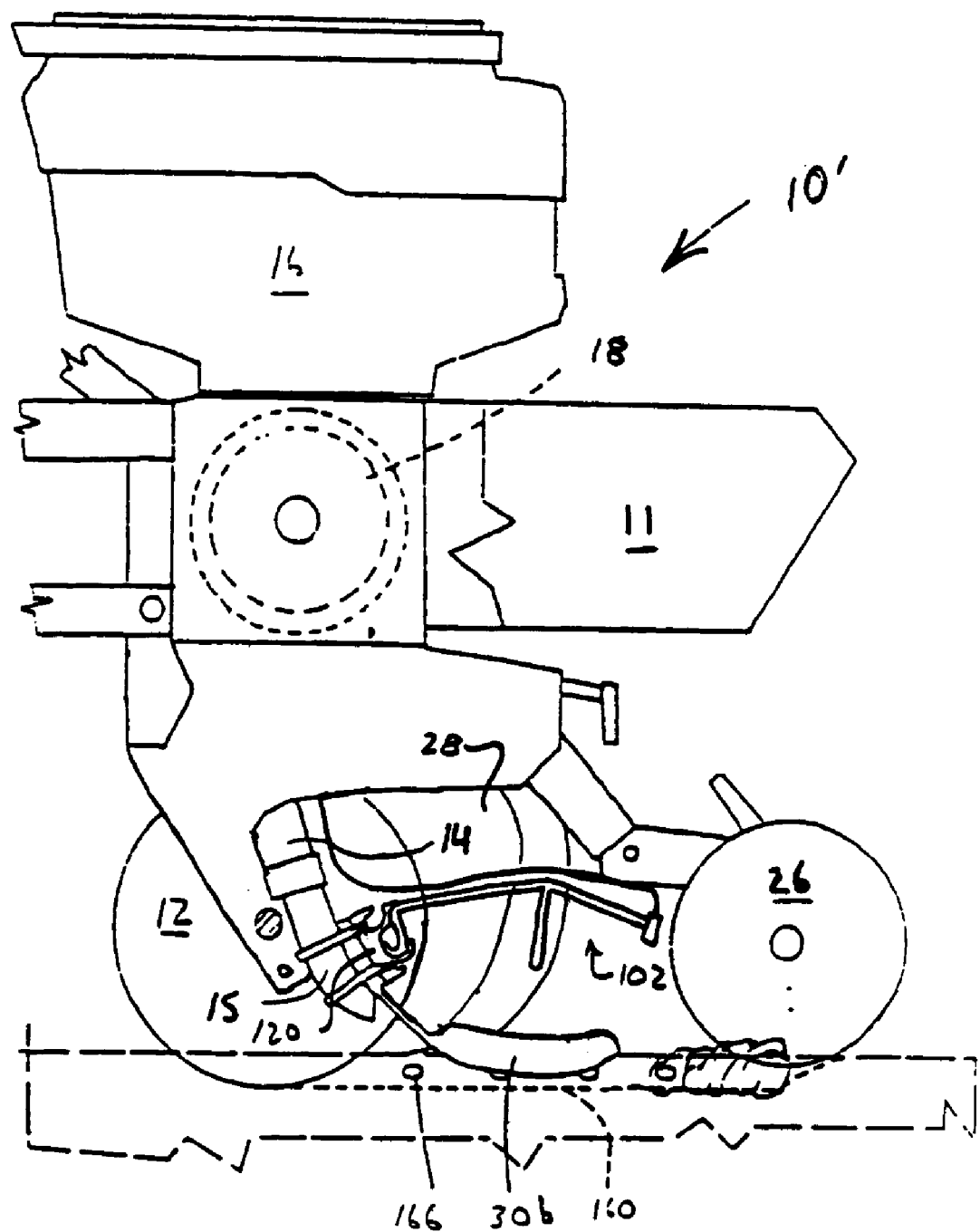
FIG. 13 is a side view of a planting assembly including the liquid application device as shown in FIG. 7 as used with an existing seed positioning device.

As previously noted, many planting assemblies include seed positioning devices, such as the REBOUNDER™ 30a and the KEETON® seed firmer 30b, as shown in FIGS. 12 and 13, respectively. Operators of planting assemblies 10' that include the seed positioning devices 30a, 30b may wish to avoid the previously noted problems that are frequently encountered while using existing devices for the applications of liquid in tandem with seed positioning devices 30a, 30b. As such, preferred embodiments of the spray arm 102 and adapter 120 of the present liquid application device 100 can be used with these devices 30a, 30b in addition to being mounted directly to the seed tube 15. Unlike the existing liquid application devices, as shown in FIGS. 3 and 4, preferred embodiments of the spray arm 102 position the delivery end 24 of the liquid delivery conduit 20 at an adequate height above the furrow 160, such that clogging of the delivery end 24 by dirt and debris can be minimized and a wide spray pattern can be achieved if desired. As previously noted, preferred embodiments of the spray arm 102 exist wherein the delivery end 24 is positioned above the furrow so as to direct liquids into only the furrow 160 or across the entire width of the furrow 160 and onto a portion of the soil surface surrounding the furrow 160. As well, multiple embodiments of the spray arm 102 are envisioned such that the spray arm 102 can accommodate varying lengths of seed positioning devices 30a, 30b.

Figure 14B:
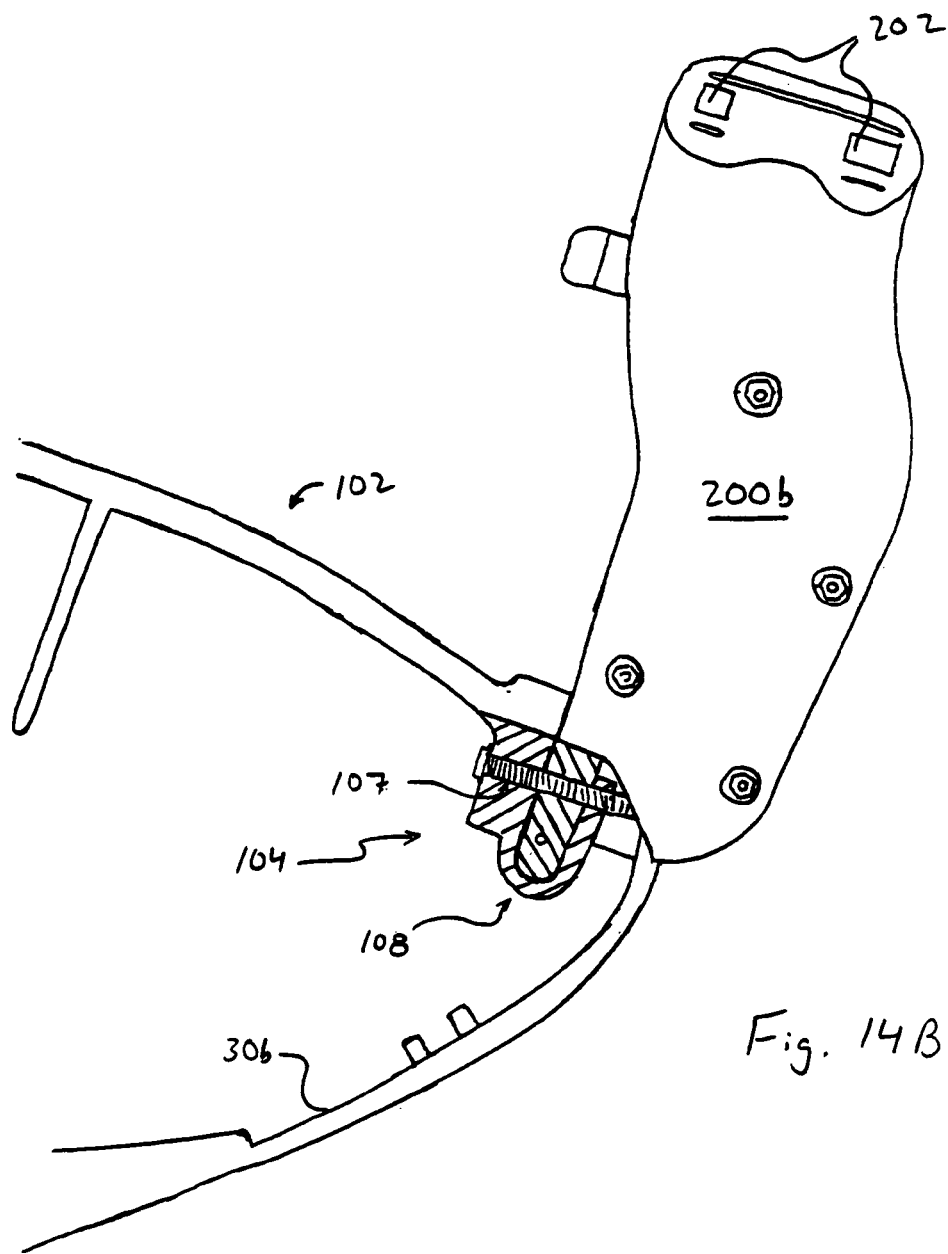
Figure 15:
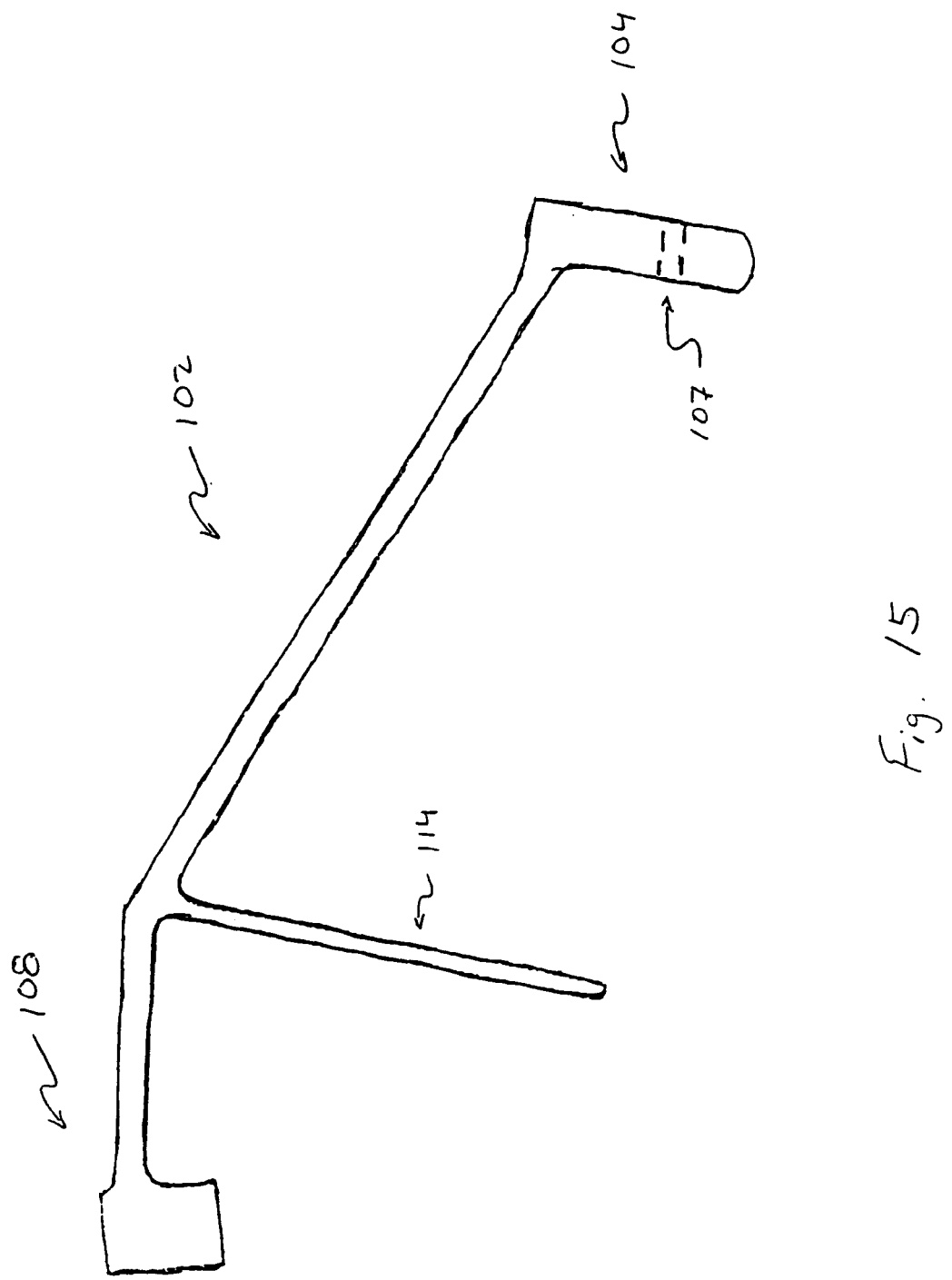
FIG. 15 is a side view of a liquid application device according to the present invention.

As previously noted, seed positioning devices can be mounted to a planter assembly frame 11 using brackets rather than mounted directly to the seed tube. Referring now to FIGS. 14A and 14B, the spray arm 102, as shown in FIG. 7, is mounted to brackets 200a and 200b, respectively. For ease of description, FIGS. 14A and 14B are partial cut-away views. FIG. 14A shows a spray arm 102 attached to the KEETON GOLD® bracket 200a. The spray arm 102 is mounted to the bracket 200a by positioning the J-shaped portion 109 around a lower portion 203 of the bracket 200a. Once in position, a threaded fastener extends through an aperture 107 formed in both the proximal end 104 of the spray arm 102 and the lower portion 203 of the bracket 200a. Note, the J-shaped portion 109 is not necessarily required for mounting the spray arm 102 to the bracket 200a, as disclosed by the embodiment of the spray arm 102 shown in FIG. 15. However, the J-shaped portion 109 offers stability to the spray arm 102 in that it extends upward into the bracket 200a. FIG. 14B shows the spray arm 102 mounted to the KEETON GOLD® wraparound bracket 200b. The spray arm 102 is mounted to bracket 200b using the same procedure as that discussed for mounting spray arm 102 to bracket 200a (FIG. 14A). As shown, the spray arm 102 includes two male threaded portions for attaching a liquid delivery conduit and a spray nozzle. Note, either one, or both, threaded male portions could be replaced with threaded female portions.

Figure 16A:
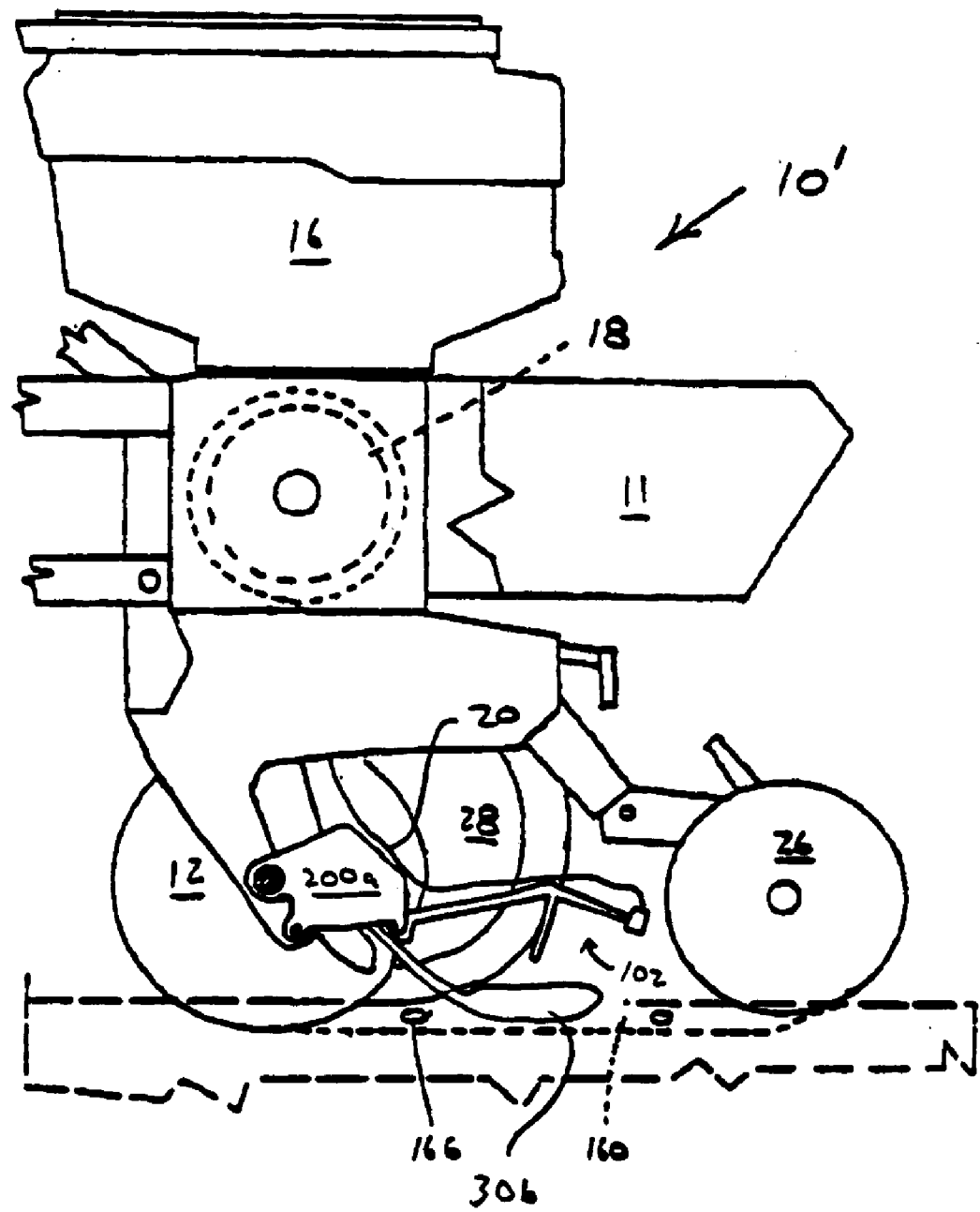
FIGS. 16A and 16B are side views of a planting assembly including an existing seed positioning device and a preferred embodiment of a liquid application device according to the present invention.
Figure 16B:
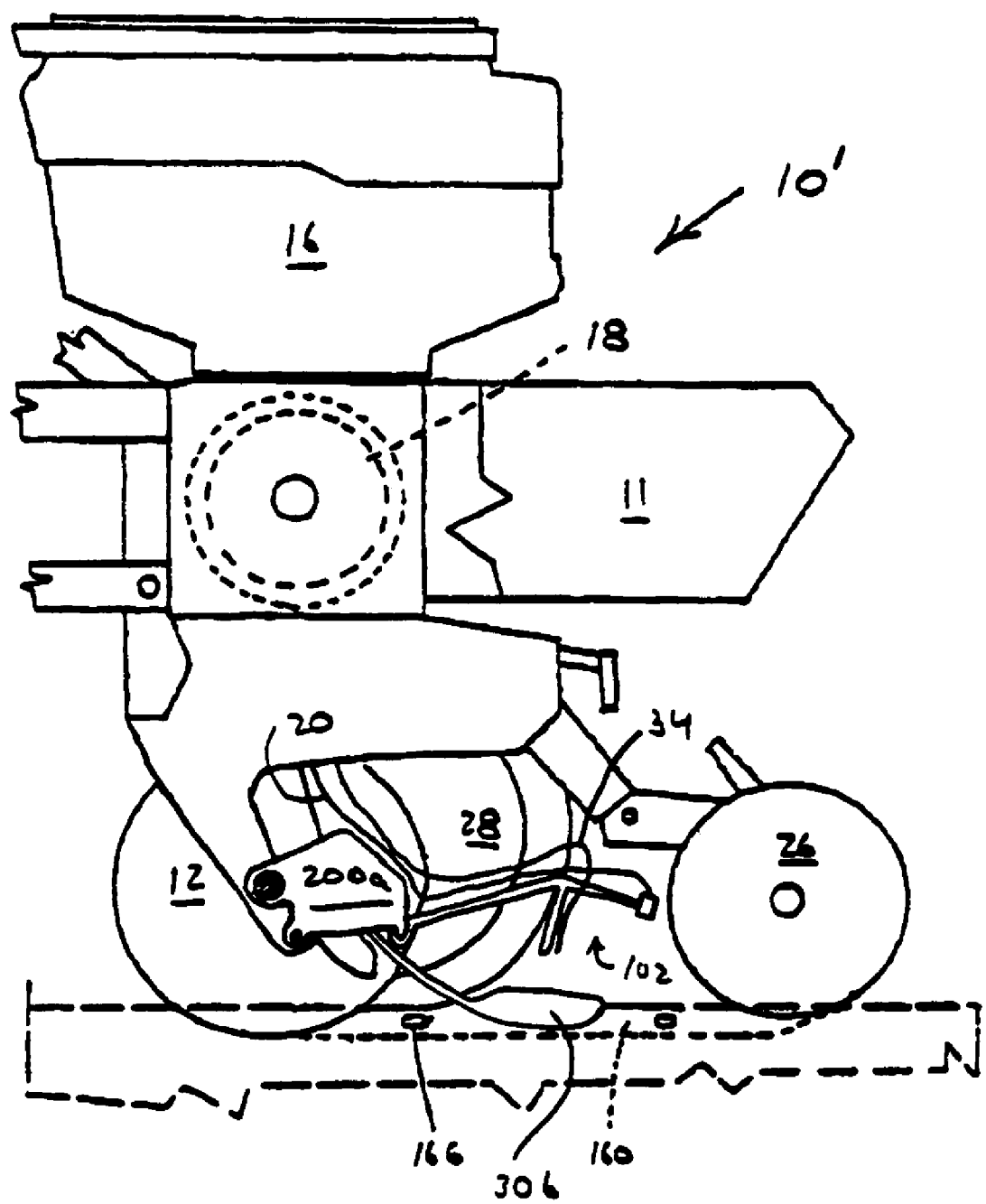

Referring now to FIGS. 16A and 16B, the preferred embodiment of a spray arm 102 attached to a KEETON GOLD® bracket 200a, as shown in FIG. 14a, is shown in combination with a planting assembly 10'. FIG. 16B shows the use of multiple liquid delivery conduits 20 and 34.

Figure 17:
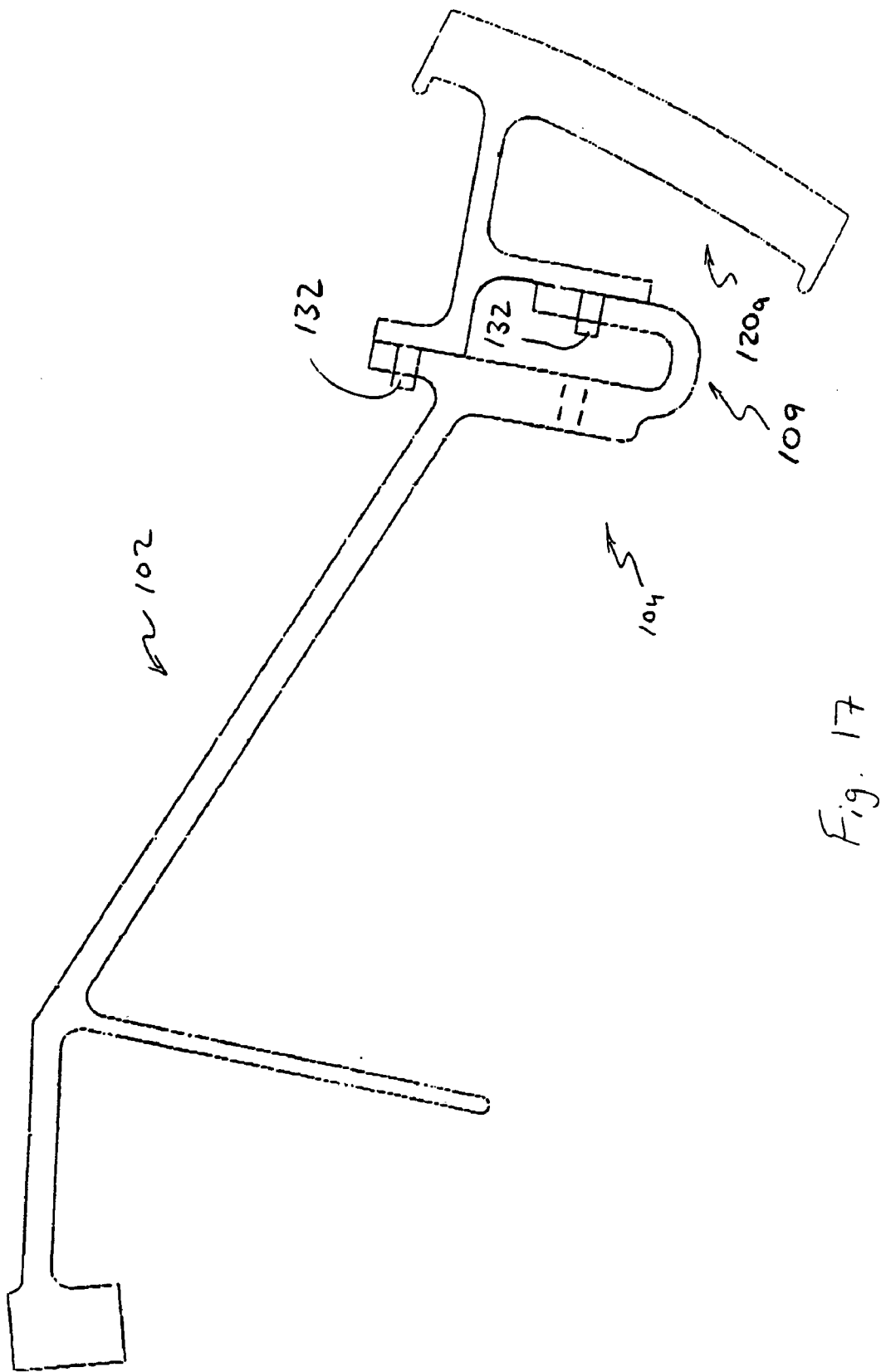
FIG. 17 is a side view of a preferred embodiment of a liquid application device according to the present invention.

FIG. 17 shows another embodiment of a spray arm 102a and adapter 120a combination. As shown, the spray arm 102a is connected to the adapter 120a by passing a number of projections 132 disposed on the adapter 120a through corresponding apertures disposed on the proximal end 104 of the spray arm 102a. The projections 132 may be configured such that they are not readily removed from the apertures, such as by fanning out once they have passed through the apertures. As before, the spray arm 102a may be mounted directly to a bracket such as 200a or 200b (FIGS. 14A and 14B) without the use of the adapter 300.

Figure 18:
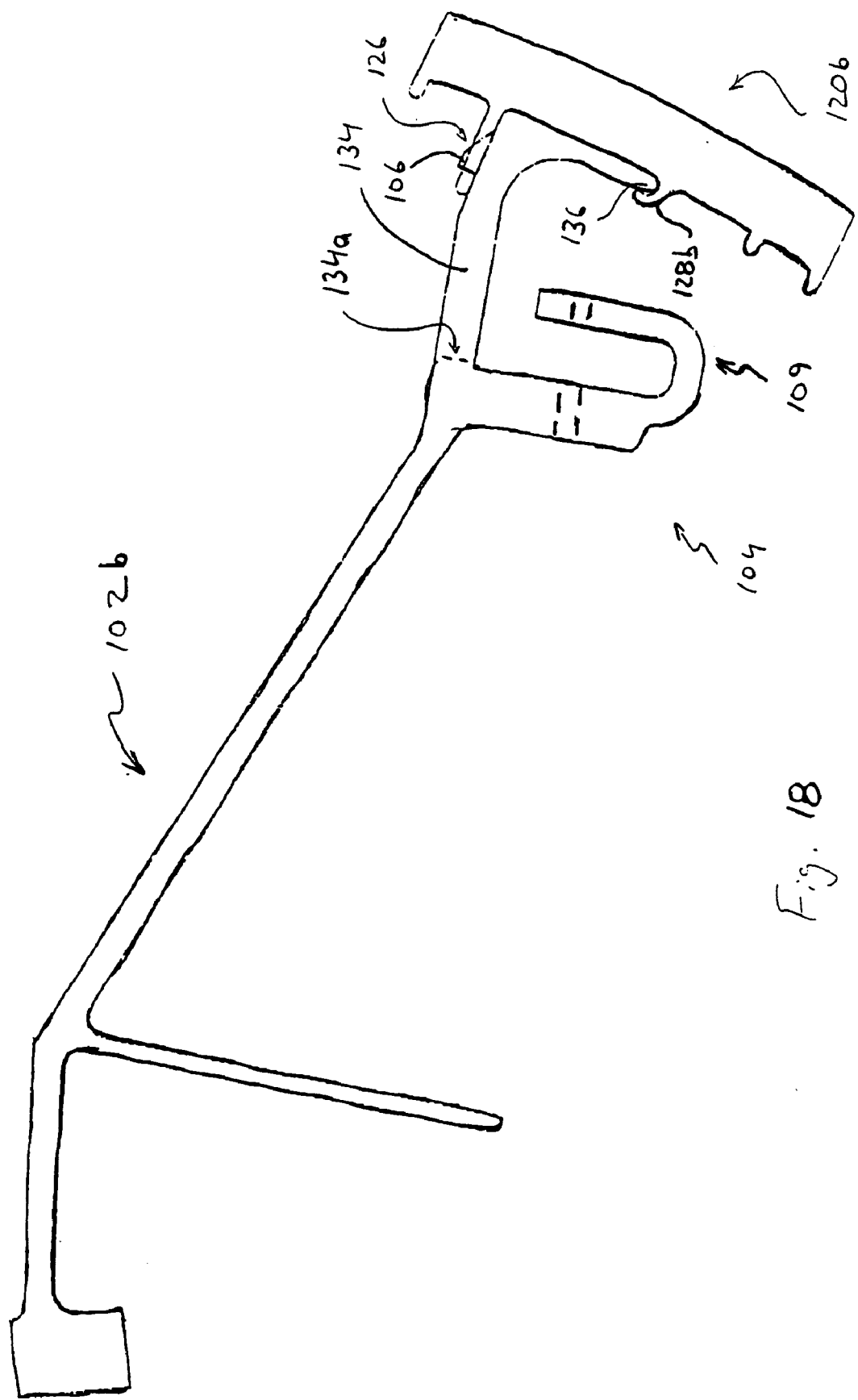
FIG. 18 is a side view of a preferred embodiment of a liquid application device according to the present invention.

FIG. 18 discloses an embodiment of a spray arm 102b and adapter 120b combination. If one desires to mount the spray arm 102b as shown to brackets 200a, 200b, a removable portion 134 is separated from the spray arm 102b at the point indicated by dashed line 134a. To connect the spray arm 102b to the adapter 120b a downwardly depending plate 136 is first positioned in the hook portion 128b of the adapter 1120b. Next, the spray arm 102b is rotated toward the adapter 120b until the locking tab 106 disposed on the spray arm 102b engages a corresponding locking aperture 126 on the adapter 120b.

Figure 19:
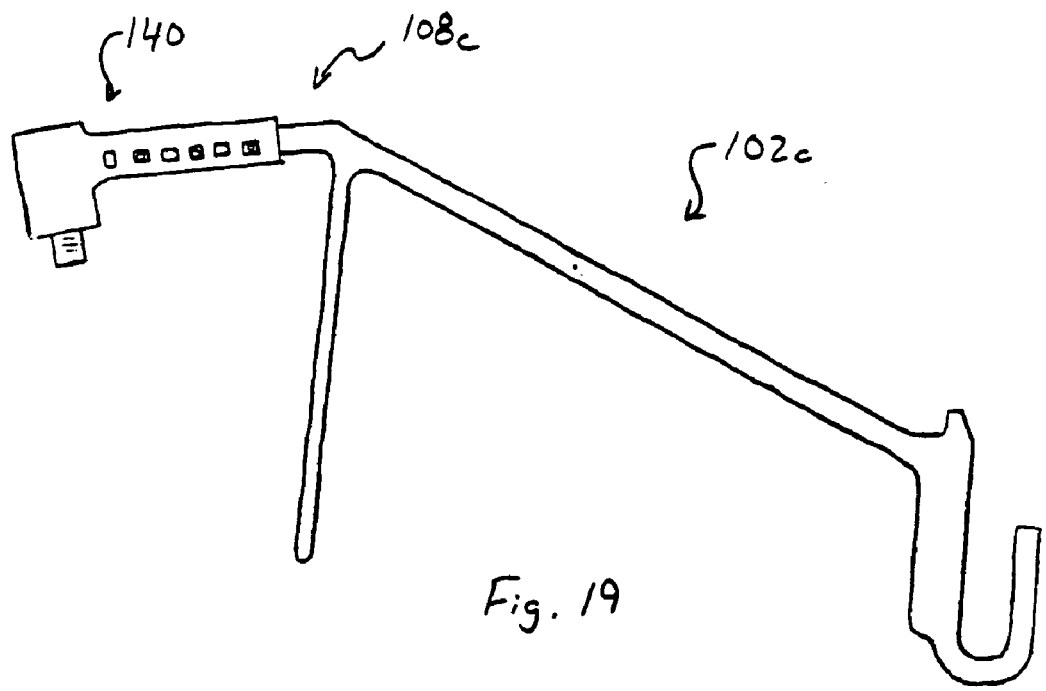
FIG. 19 is a side view of a preferred embodiment of a liquid application device according to the present invention.
Figure 20:
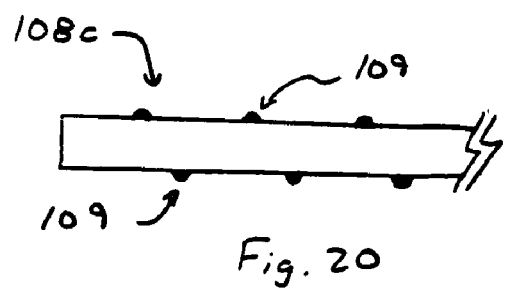
FIG. 20 is a partial top view of the distal end of the spray arm shown in FIG. 19.
Figure 21A:
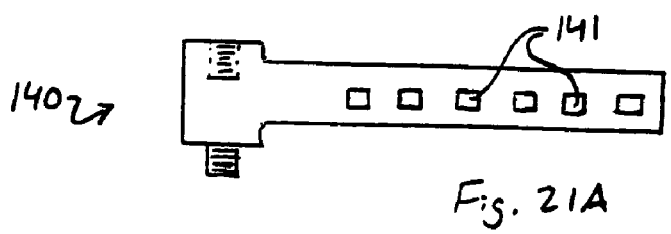
FIGS. 21A and 21B are side and top views, respectively, of the spray head shown in FIG. 19.
Figure 21B:
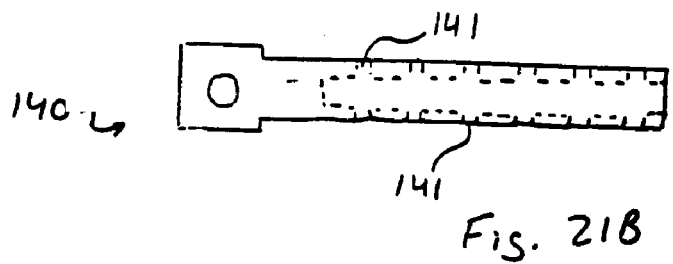

FIG. 19 discloses an embodiment of a spray arm 102c that includes a telescoping spray head 140. As shown, the spray head 140 is slidably received on the distal end 108c of the spray arm 102c. Preferably, the spray head 140 is secured to the distal end 108c by a plurality of projections 109 (FIG. 20) formed on the distal end 108c which are received within slots 141 formed in the spray head 140 (FIGS. 21A and 21B). Providing multiple projections 109 and slots 141 allows the spray head 140 to be selectively adjusted on the spray arm 102c. As such, the spray head 140 may be extended and/or retracted depending upon the desired positioning of the spray head 140.

Figure 22:
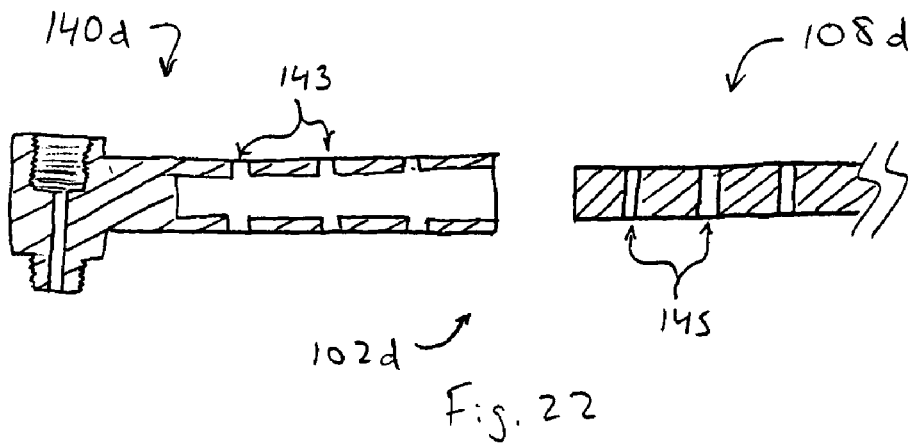
FIG. 22 is a partial, cut-away, side view of a preferred embodiment of a liquid application device according to the present invention.

FIG. 22 discloses an embodiment of a spray arm 102d that includes a telescoping spray head 140d. As shown, the spray head 140d is slidably received on the distal end 108d of the spray arm 102d. Preferably, the spray head 140d includes a plurality of apertures 143 that are spaced such that they can be aligned with a plurality of channels 145 formed on the distal end 108d. The spray head 140d is secured to the distal end 108d by aligning the desired apertures 143 with the desired channels 145 and passing a securing means such as a bolt, screw, pin, cotter key, etc. therethrough. As such, the spray head 140d may be extended and/or retracted depending on the desired positioning of the spray head 140d.

Figure 23:
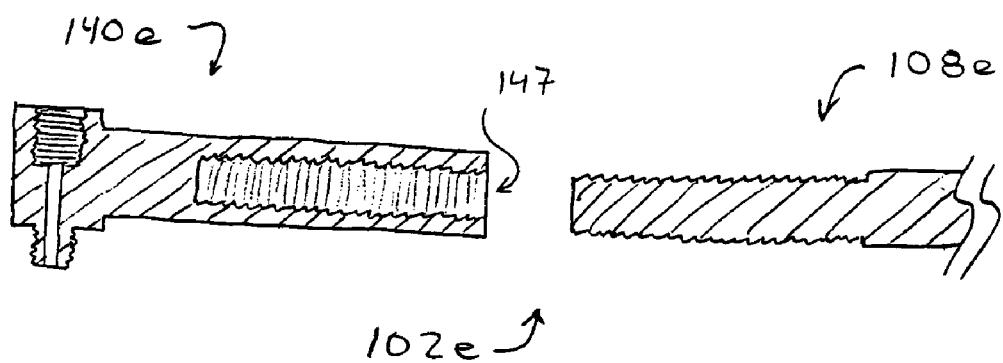
FIG. 23 is a partial, cut-away, side view of a preferred embodiment of a liquid application device according to the present invention.

FIG. 23 discloses an embodiment of a spray arm 102e that includes a telescoping spray head 140e. As shown, the spray head 140e is threadably received on the distal end 108e of the spray arm 102e. The spray head 140e is retracted and extended by rotating the spray head 140e, thereby causing the spray head 140e to travel up and down the distal end 108e of the spray arm 102e. As such, the spray head 140e may be extended and/or retracted depending upon the desired positioning of the spray head 140e.

Figure 24:
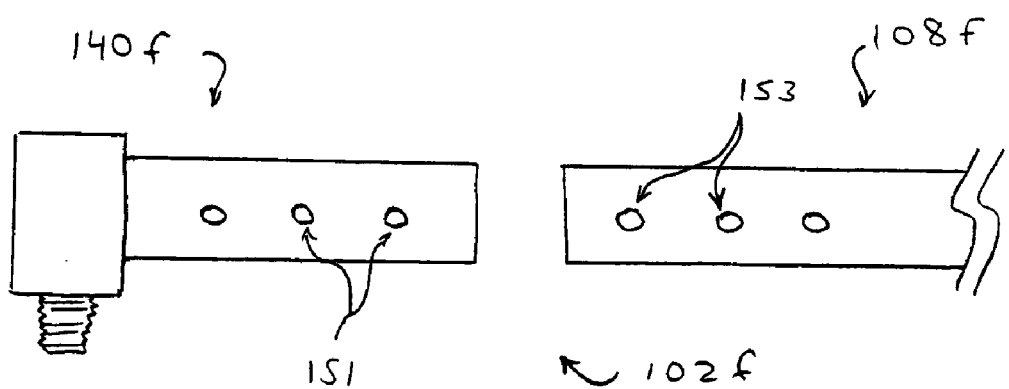
FIG. 24 is a partial side view of a preferred embodiment of a liquid application device according to the present invention.

FIG. 24 discloses an embodiment of a spray arm 102f that includes a telescoping spray head 140f. As shown, the spray head 140f includes a plurality of apertures 151 that are spaced such that one or more of the apertures 151 disposed on the spray head 140f may be aligned with one or more apertures 153 formed on the distal end 108f of the spray arm 102f. After the desired apertures 151, 153 have been aligned, a securing means such as a bolt, screw, cotter key, rivet, etc., is passed therethrough such that the spray head 140f is secured to the distal end 108f. As such, the spray head 140f may be extended and/or retracted depending upon the desired positioning of the spray head 140f.

Figure 26A:
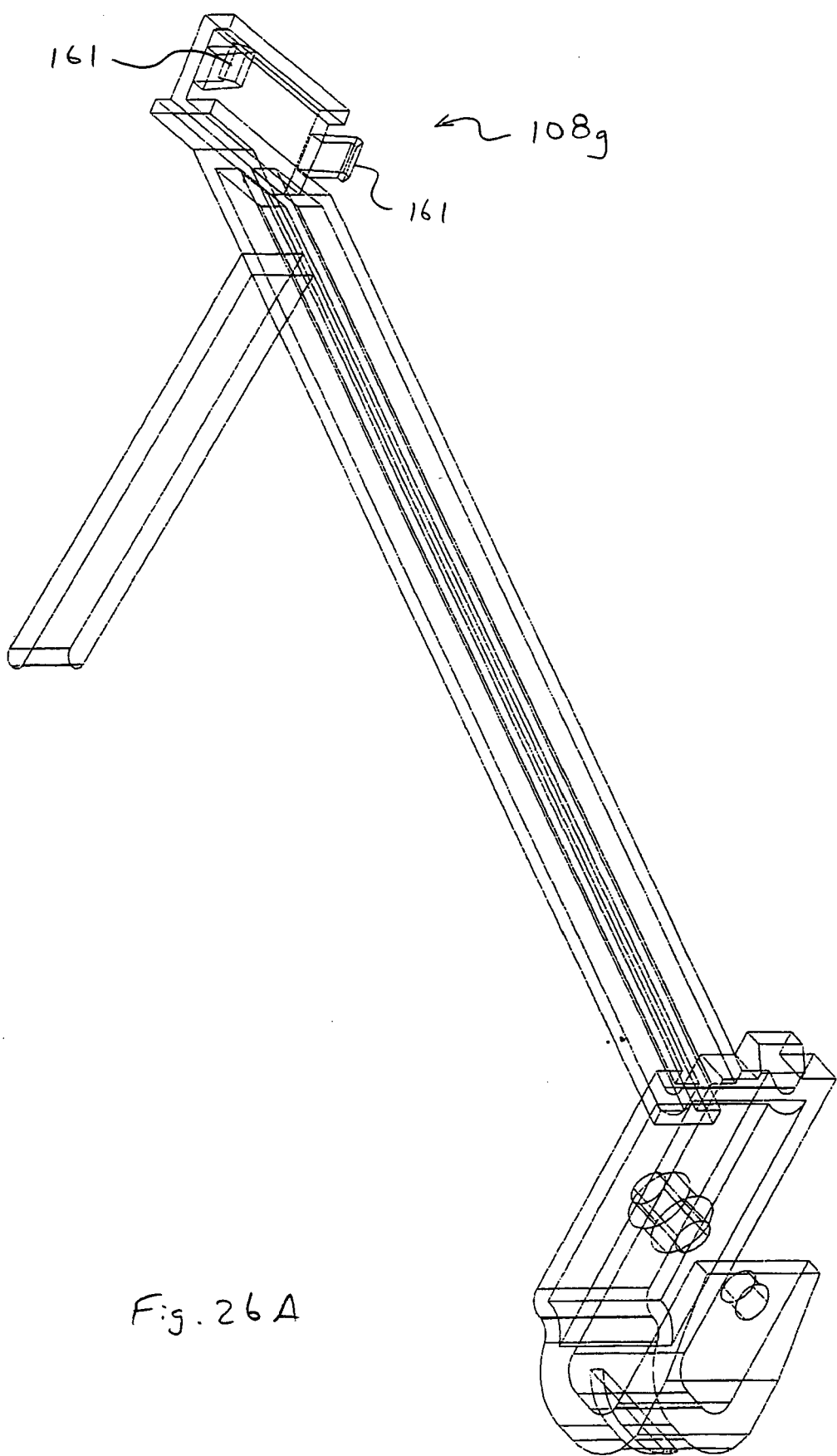
FIGS. 26A and 26B are side perspective views of the spray arm and spray head, respectively, of the liquid application device as shown in FIG. 25.
Figure 26B:
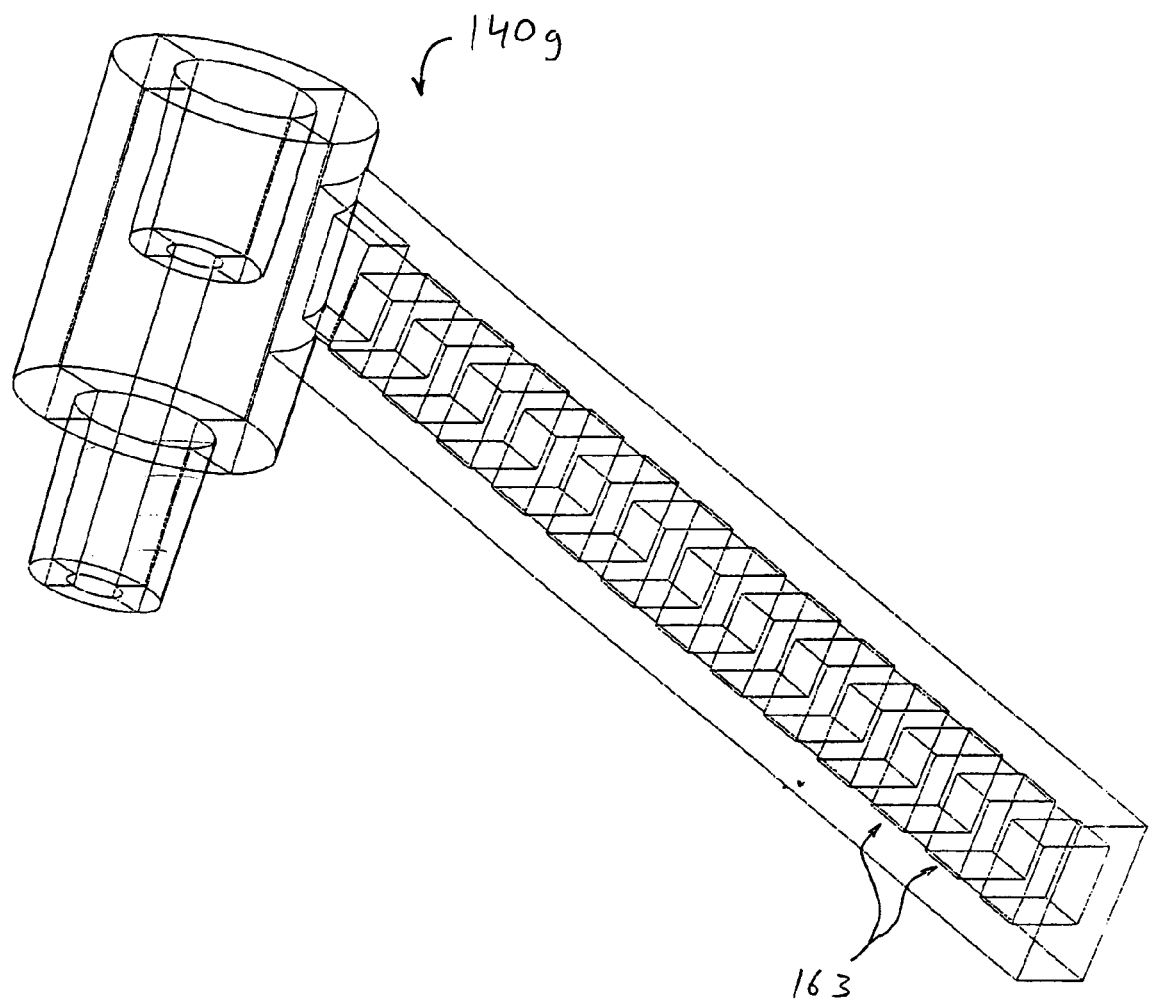

FIG. 25 discloses an embodiment of a spray arm 102g that includes telescoping spray head 140g. As shown in FIGS. 26A and 26B, the distal end 108g of the spray arm 102g includes a pair of opposed tabs 161 configured to be received within the plurality of channels 163 formed on the spray head 140g. To mount the spray head 140g to the distal end 108g, the opposed tabs 161 are urged through the desired pair of channels 163. A camming effect between the opposed tabs 161 and channels 163 causes the opposed tabs to be urged inwardly toward each other until the tabs have cleared the channels 163 and can return to their at rest positions, thereby securing the spray head 140g to the distal end 108g. To remove the spray head 140g from the distal end 108g, a user urges the distal ends of the opposed tabs 161 towards each other until the distal ends of the opposed tabs 161 clear the walls of the channels 163. The spray head 140g is then pulled away from the distal end 108g until the opposed tabs 161 are clear of the channels 163. Providing multiple channels 163 allows the spray head 140g to be selectively adjusted on the spray arm 102g. As such, the spray head 140g may be extended and/or retracted depending upon the desired positioning of the spray head 140g.

Various spray arm embodiments are envisioned that would include multiple spray nozzles, drip tubes, electrical devices (such as seed detectors), etc., positioned on the spray arm 102. Also, embodiments are envisioned which include variously configured proximal ends 104 for mounting to brackets other than those disclosed in the pending application. As well, there is no intent to limit all embodiments of the spray arm to the requirement of having a deflector shield 114.

Figure 27A:
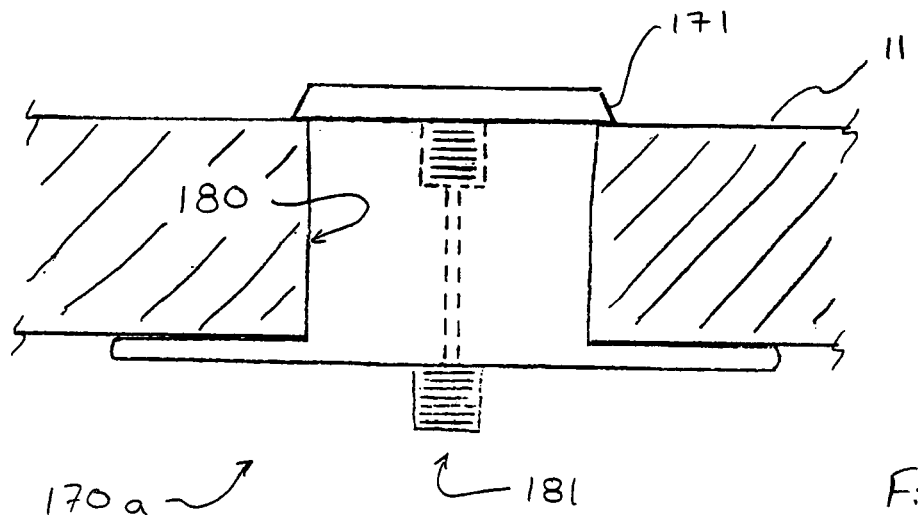
FIGS. 27A and 27B are side and top views, respectively, of a liquid application device according to the present invention.
Figure 27B:
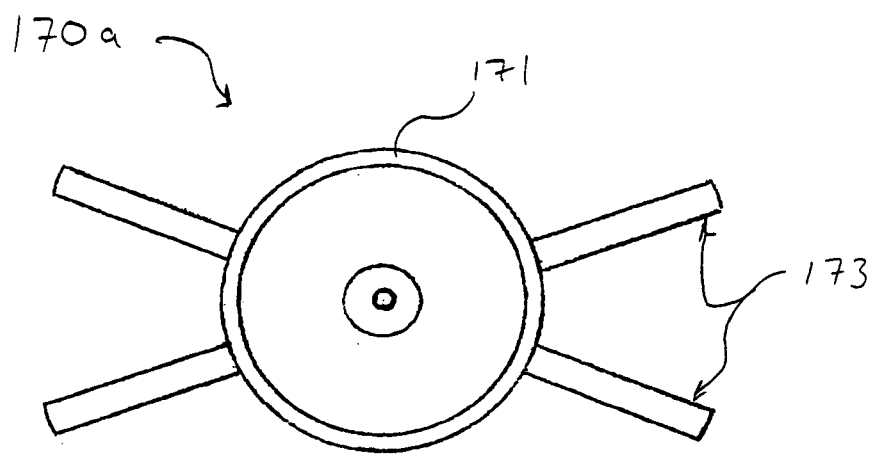
Figure 28:
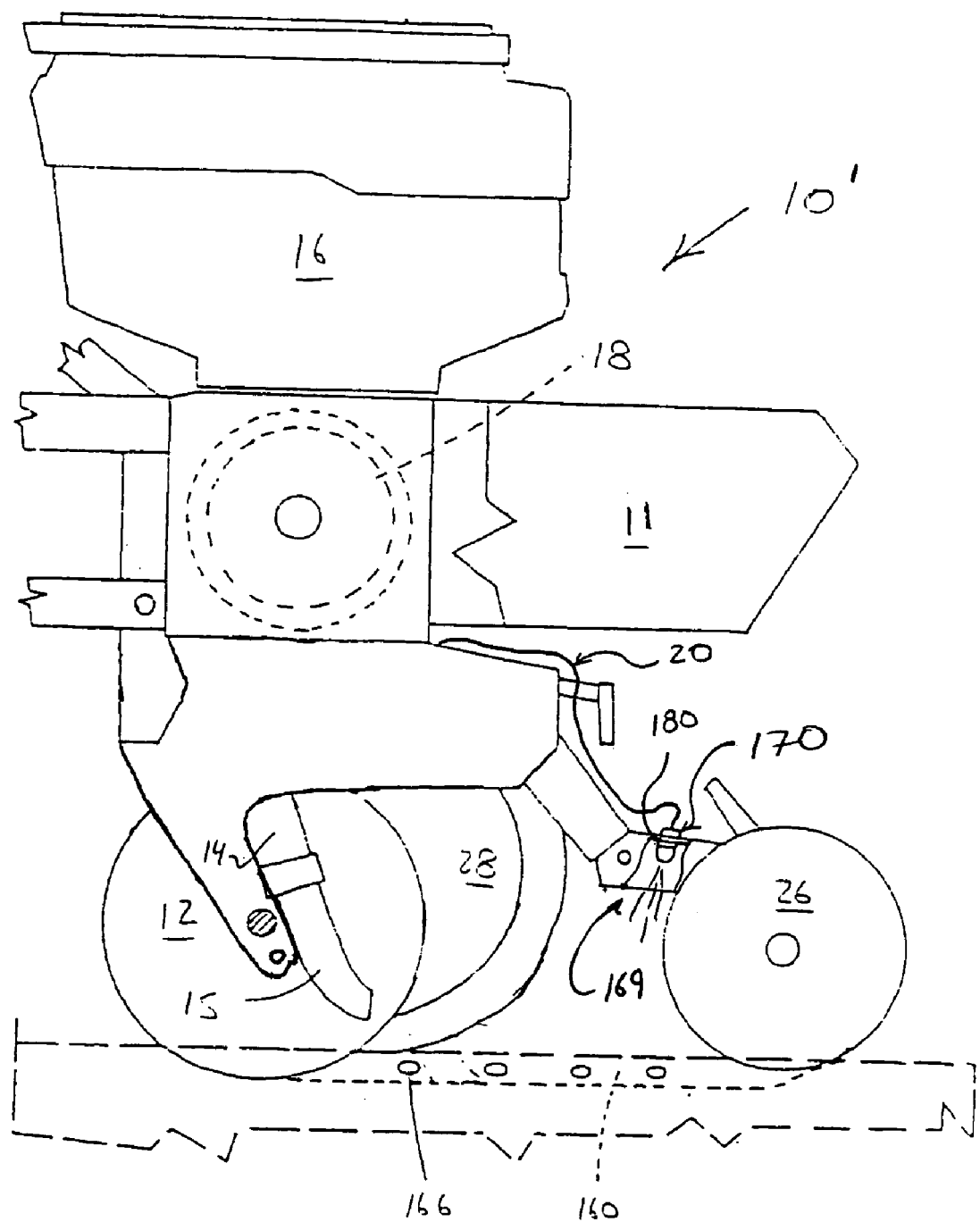
FIG. 28 is a partial cut-away, side view of a planting assembly including the liquid application device as shown in FIGS. 27A and 27B.

FIGS. 27A and 27B disclose an embodiment of a liquid application device for use with a seed planting assembly. As shown, the spray plug 170a is configured to be mounted to a portion of the frame 11 of a seed planting assembly 10' as shown in FIG. 28. Seed planting assemblies frequently include fertilizer tube holes 180 that permit dry fertilizer tubes to pass through portions of the frame 11 for depositing dry fertilizer into furrows. An exemplary fertilizer tube hole 180 is shown in the partial cut-away section of the frame 11 indicated in general by reference numeral 169 in FIG. 28.

A preferred embodiment of a spray plug 170a is configured to be pushed upwardly through the fertilizer tube hole 180 and retained in position by a lip 171 that engages a portion of the frame. As shown, the spray plug 170a also includes a plurality of fingers 173 to prevent rotation of the spray plug 170a within the fertilizer tube hole 180 by engaging portions of the frame. Preferably, the spray plug 170a includes a threaded male portion 181 such that it may threadably receive a spray nozzle, as shown in FIG. 28. Fertilizer tube holes 180 typically range in diameter from 1 to 2 inches, with the most common diameter being approximately 1½ inches. As such, spray plugs 170a of varying diameters are envisioned. As well, in that sheet metal thicknesses used in the construction of various planning assemblies vary, embodiments of spray plugs 170a are envisioned in which the height of the spray plugs 170a varies such that the spray plug 170a can be adequately secured to the frame. Embodiments of spray plugs 170a further include spray plugs 170a having other than circular cross sections, and spray plugs 170a that maintain their position within the frame by friction fit within the fertilizer tube holes 180.

Figure 29A:
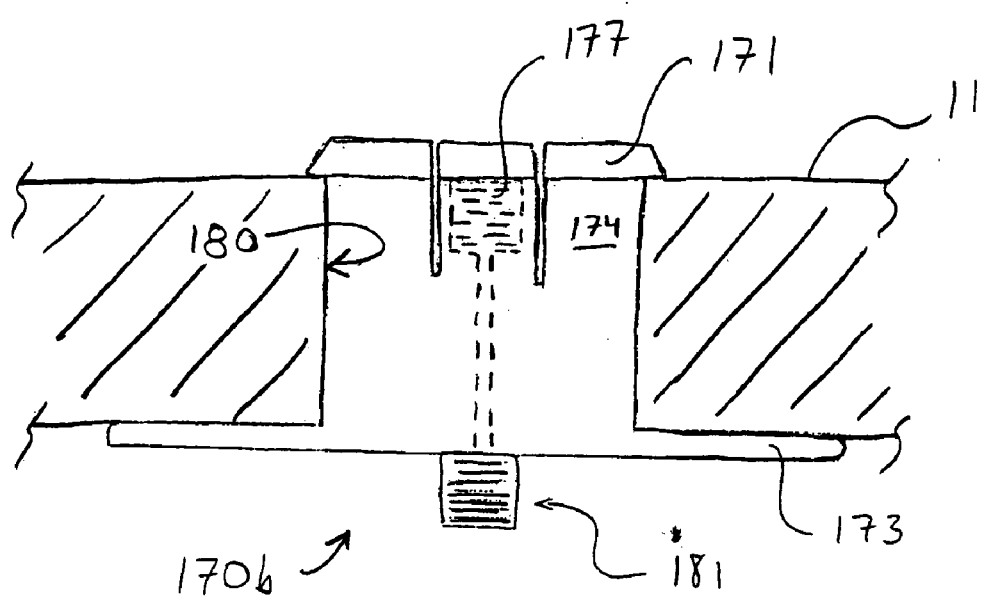
FIGS. 29A and 29B are side and top views, respectively, of a liquid application device according to the present invention.
Figure 29B:
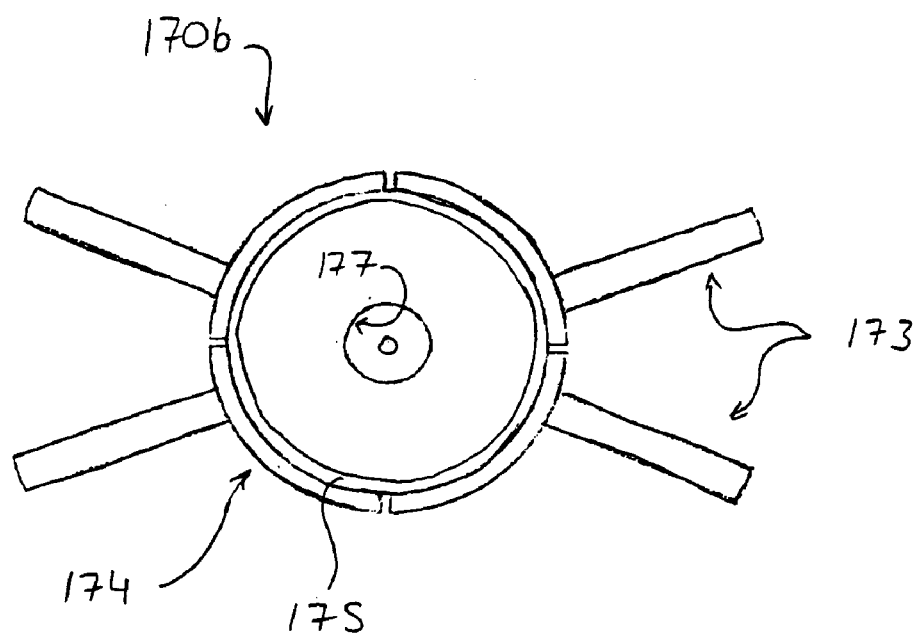

FIGS. 29A and 29B disclose an alternate embodiment of a spray plug 170b for use with a seed planting assembly. Similar to the spray plug 170a shown in FIGS. 27A and 27B, spray plug 170b is configured to be mounted to a portion of the frame 11 of a seed planting assembly 10' as shown in FIG. 28. Although as previously noted, seed planting assemblies frequently include fertilizer tube holes 180 that permit dry fertilizer to pass through portions of the frame 11, they can also be used for mounting various embodiments of spray plugs 170a, 170b. However, individual holes may be created in the frame 11 as desired for positioning the spray plugs 170a, 170b.

As shown, the spray plug 170b includes a plurality of mounting tabs 174 that each include a portion of the lip 171 at a free end and that are separated from the main body of the plug 170b by a gap 175 along the length of the tab 174. This construction allows the individual mounting tabs 174 to be urged inwardly toward the main body of the plug 170b, thereby allowing each portion of the lip 171 to be more easily passed through the frame 11, such as through fertilizer tube hole 180. Once each portion of the lip 171 has cleared the top surface of the frame 11, the respective mounting tab 174 springs outward into its at rest position, thereby causing each portion of the lip 171 to engage the upper portion of the frame 11. Preferably, spray plug 170b includes a plurality of fingers 173 that prevent rotation of the spray plug 170b by engaging portions of the frame 11. Ideally, the lip 171 and fingers 173 are separated by a distance approximately equal to the thickness of the frame 11. As shown, the spray plug 170b includes a threaded female portion 177 and threaded male portion 181 for receiving a liquid delivery conduit 20 and spray nozzle, respectively, as shown in FIG. 28. Various embodiments of the spray plug 170b can include only threaded female portions 177, threaded male portions 181, or any combination thereof, dependent upon the requirements for mounting the liquid delivery conduit 20 and/or spray nozzle.

Figure 30:
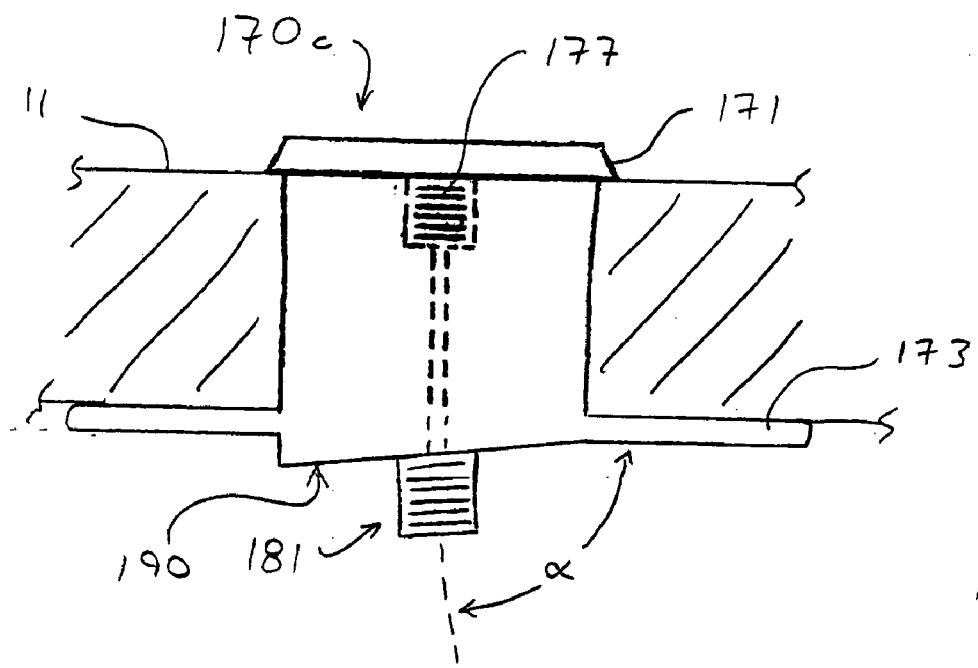
FIG. 30 is a side view of a liquid application device according to the present invention.
Figure 31:
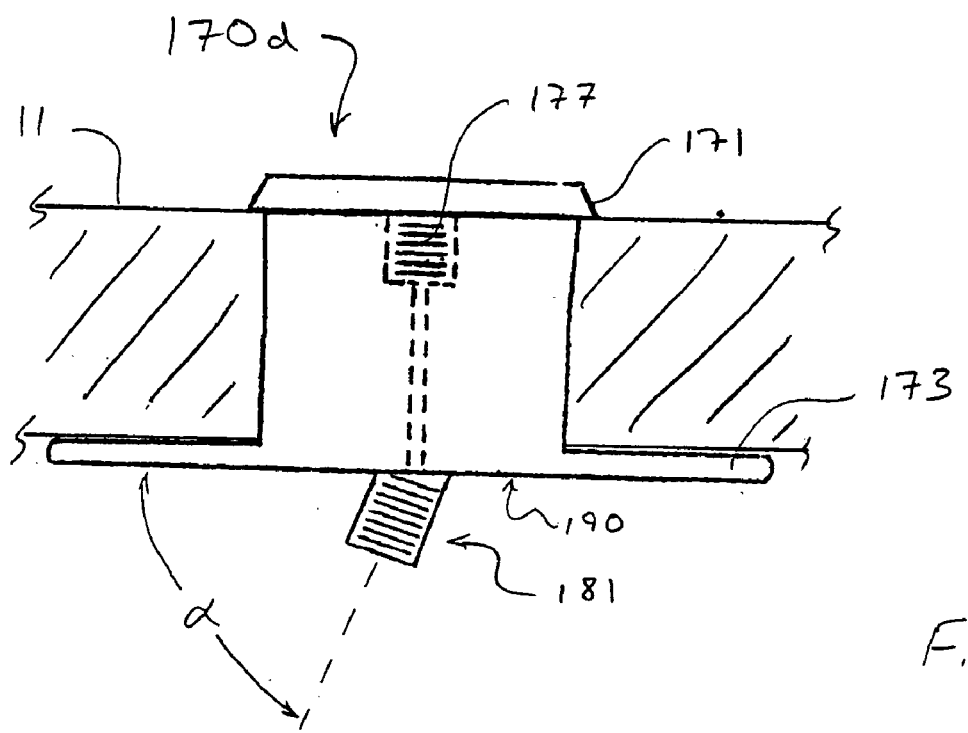
FIG. 31 is a side view of a liquid application device according to the present invention.

Other embodiments of the spray plug 170c are configured such that the desired liquid is dispensed from the spray plug 170c at an angle (α) relative to the planting assembly frame 11. As shown in FIG. 30, the bottom surface 190 of the spray plug 170c is slanted relative to the frame 11 and the threaded male portion 181 protrudes from the bottom surface 190 at 90°. As such, the desired liquid is dispensed at an angle (α) relative to the frame 11. As well, as shown in FIG. 31, the threaded male portion 181 can be configured to project from the lower surface 190 of the spray plug 170d at an angle (α). As such, the desired liquid will be dispensed at that same angle (α) relative to the frame 11.

It should be emphasized that the above-described embodiments of the present planting assembly and liquid application device for same, particularly, any "preferred" embodiments, are merely possible examples of implementations, merely set forth for a clear understanding of the principles of the planting assembly and liquid application device for same. Many variations and modifications may be made to the above-described embodiments of the planting assembly and liquid application device for same without departing substantially from the spirit and principles of the planting assembly. All such modifications and variations are intended to be included herein within the scope of this disclosure of the present planting assembly and liquid application device for same and protected by the following claims.

What is claimed is:

1. A planting assembly comprising:
    a frame, a furrow opening mechanism, a seed tube for directing a seed into a furrow, a liquid source, a liquid delivery conduit having a delivery end, and a furrow closing mechanism;
    an adapter configured for mounting to the seed tube; and
    a spray arm including a proximal end configured for removably mounting to the adapter, a central portion, and a distal end, the central portion extending rearward such that the distal end is disposed above the furrow;
    wherein the liquid delivery conduit is in fluid communication with the liquid source and the delivery end is adjacent to the distal end.

2. The planting assembly of claim 1, wherein the spray arm is configured such that the liquid is dispensed from the delivery end downwardly and forwardly toward the furrow aft of the seed tube.

3. The planting assembly of claim 1, further comprising a spray nozzle disposed on the distal end of the spray arm in fluid communication with the delivery end.

4. The planting assembly of claim 1, wherein the spray arm is configured such that the liquid is dispensed from the delivery end substantially downwardly.

5. The planting assembly of claim 1, further comprising:
    a seed positioning device for positioning the seed within the furrow; and
    a bracket configured for mounting the seed positioning device to the frame, the bracket being mounted to the frame and the seed positioning device being mounted to the bracket;
    wherein the proximal end of the spray arm is further configured for mounting to the bracket.

6. The planting assembly of claim 5, wherein the spray arm is configured such that the liquid is dispensed substantially downwardly into the furrow aft of the seed positioning device.

7. The planting assembly of claim 1, wherein the liquid is selected from a group consisting of insecticides, herbicides, fungicides, nematicides, fertilizers, starters, inoculants, micronutrients, trace minerals, and water.

8. The planting assembly of claim 1, further comprising:
    a seed positioning device for positioning the seed within the furrow, the seed positioning device being mounted to the seed tube;
    wherein the adapter is further configured for mounting to the seed positioning device.

9. A planting assembly comprising:
    a frame, a furrow opening mechanism, a seed tube for directing a seed into a furrow, a liquid source, a liquid delivery conduit having a delivery end, and a furrow closing mechanism;
    an adapter configured for mounting to the seed tube; and
    a spray arm including a proximal end configured for mounting to the adapter, a central portion, and a distal end, the central portion extending rearward such that the distal end is disposed above the furrow;
    wherein the liquid delivery conduit is in fluid communication with the liquid source and the delivery end is adjacent to the distal end; and
    wherein the spray arm further comprises a deflector shield disposed on the central portion and extending downwardly toward the furrow.

10. A method performed in conjunction with the operation of a planting assembly, the planting assembly having a frame, a furrow opening mechanism, a seed tube for directing seed into the furrow, a liquid source, a liquid delivery conduit having a delivery end, and a furrow closing mechanism, the method comprising:

providing a bracket configured to be attached to the planting assembly;

providing a spray arm configured to be removably mounted to the bracket;

forming a furrow;

directing a seed into the furrow;

directing a liquid from the liquid source substantially downwardly into at least a portion of the furrow aft of the seed tube, thereby applying the liquid to the seed, the furrow, and an area outside the furrow; and closing the furrow over the seed.

11. The method of claim 10, wherein directing the liquid further comprises:

spraying the liquid substantially downwardly into the furrow aft of the seed tube.

12. The method of claim 10, further comprising:

positioning the seed in the furrow prior to applying the liquid.

13. The method of claim 10, wherein the liquid is selected from the group consisting of insecticides, herbicides, fungicides, nematicides, fertilizers, starters, inoculants, micronutrients, trace minerals, and water.

14. The method of claim 10, further comprising:

providing a spray nozzle configured to be mounted on a distal end of the spray arm in fluid communication with the delivery end.

15. The method of claim 14, further comprising:

adjusting a spray pattern of the spray nozzle.

16. The planting assembly of claim 10, wherein the bracket is configured to be attached to the frame.

17. The planting assembly of claim 10, further comprising a seed positioning device for positioning the seed within the furrow, wherein the seed positioning device is supported by the bracket.

18. The planting assembly of claim 17, further comprising a seed positioning device for positioning the seed within the furrow, wherein the bracket is configured to be attached to the planting assembly via the seed positioning device.

19. A planting assembly comprising:

a frame;

a seed guide;

a furrow opening mechanism configured to create a furrow;

a seed tube for directing a seed into the furrow;

a liquid source;

a liquid delivery conduit having a delivery end;

a bracket designed to be mounted to the planting assembly;

a furrow closing mechanism;

a spray arm including a proximal end, a central portion, and a distal end, the proximal end designed to be mounted to the bracket and the central portion extending rearward toward a back end of the planting assembly such that the distal end is disposed above the furrow; and a spray nozzle disposed near the distal end of the spray arm, the spray nozzle being in fluid communication with the delivery end of the liquid delivery conduit;

wherein the liquid delivery conduit is in fluid communication with the liquid source and the delivery end is disposed adjacent to the distal end.

20. The planting assembly of claim 19, wherein the spray arm is configured such that the liquid is dispensed from the delivery end downwardly toward the furrow aft of the seed tube.

21. The planting assembly of claim 20, wherein the spray arm is further configured such that the liquid is dispensed from the delivery end forwardly toward the furrow aft of the seed tube.

22. The planting assembly of claim 19, wherein the spray arm is configured such that the liquid is dispensed from the delivery end substantially downwardly.

23. The planting assembly of claim 19, wherein the bracket is configured to be attached to the seed tube.

24. A planting assembly comprising:

a frame;

a seed tube, supported by the frame, for directing seeds into a furrow;

a liquid source supported by the frame; and a liquid delivery conduit having a delivery end;

a seed positioning device for positioning the seeds within the furrow;

means for securing the seed positioning device to the planting assembly; and a spray arm including a proximal end and a distal end, the proximal end being supported by the means for securing and the distal end being disposed above the furrow;

wherein the liquid delivery conduit is in fluid communication with the liquid source and the delivery end is adjacent to the distal end.

25. The planting assembly of claim 24, wherein the spray arm is removably secured to the means for securing.

26. The planting assembly of claim 24, wherein the securing means attaches the seed positioning device to the seed tube.

27. A liquid application device for use with a planting assembly, the planting assembly having a frame, a furrow opening mechanism, a seed tube for directing a seed into a furrow, a liquid source, a liquid delivery conduit having a delivery end, and a furrow closing mechanism, the liquid application device comprising:

a bracket adapted for connection to the planting assembly; and a spray arm including a proximal end, a distal end, and a central portion, the proximal end configured to be removably mounted to the bracket, the distal end being disposed above the furrow;

wherein the liquid delivery conduit is in fluid communication with the liquid source and the delivery end is disposed near the distal end of the spray arm.

28. The liquid application device of claim 27, further comprising an adapter having a first side configured for mounting to the seed tube and a second side configured to removably receive the proximal end of the spray arm.

29. The liquid application device of claim 28, further comprising:

a hook portion and an extension defining a locking aperture extending from the second side of the adapter; and a locking tab and a J-shaped extension disposed on the proximal end of the spray arm, the J-shaped portion configured to engage the adapter and the locking tab configured to removably engage the locking aperture;

wherein the J-shaped portion is received within the hook portion and the locking tab is removably received within the locking aperture, thereby removably securing the spray arm to the adapter.

30. The liquid application device of claim 27, further comprising:
   means for spraying the liquid into the furrow and into an area outside the furrow;
   wherein the means for spraying is in fluid communication with the delivery end of the liquid delivery conduit.

31. The liquid application device of claim 30, further comprising:
   means for adjusting the spray pattern of the spraying means.

32. A liquid application device for use with a planting assembly having a frame, a furrow opening mechanism, a seed tube for directing a seed into a furrow, a liquid source, a liquid delivery conduit having a delivery end, and a furrow closing mechanism, the device comprising:
   a spray arm including a proximal end configured for mounting to the planting assembly, a central portion, and a distal end, the central portion extending rearward such that the distal end is disposed above the furrow; and
   a spray head configured to be telescopically received on the distal end of the spray arm;
   wherein the liquid delivery conduit is in fluid communication with the liquid source and the delivery end is adjacent to the distal end.

33. The liquid application device of claim 32, further comprising:
   a plurality of projections disposed on opposing sides of the distal end of the spray head; and
   a plurality of slots formed in the spray head, the plurality of slots being configured to receive at least one of the plurality of projections, so that the spray head is removably secured to the spray arm.

34. The liquid application device of claim 32, wherein the distal end of the spray arm is threadably secured to the spray head.

35. The liquid application device of claim 32, further comprising:
   a plurality of apertures formed in the distal end of the spray arm;
   at least a pair of corresponding apertures formed in the spray head, the pair of corresponding apertures spaced such that each of the pair of corresponding apertures aligns with a respective aperture on the spray arm simultaneously; and
   securing means configured to pass through the aligned apertures and corresponding apertures, thereby removably securing the spray head to the spray arm.

* * * * *